United States Patent
You et al.

(10) Patent No.: US 10,166,548 B2
(45) Date of Patent: Jan. 1, 2019

(54) DUST COLLECTION ASSEMBLY, AIR PURIFICATION DEVICE AND AIR CONDITIONER

(71) Applicants: GD MIDEA AIR-CONDITIONING EQUIPMENT CO., LTD., Foshan (CN); MIDEA GROUP CO., LTD., Foshan (CN)

(72) Inventors: Bin You, Foshan (CN); Min Zhang, Foshan (CN); Zhenlong Tian, Foshan (CN); Zhengqing Yi, Foshan (CN)

(73) Assignee: GD MIDEA AIR-CONDITIONING EQUIPMENT CO., LTD., Foshan, Guangdong (CN)

( * ) Notice: Subject to any disclaimer, the term of this patent is extended or adjusted under 35 U.S.C. 154(b) by 160 days.

(21) Appl. No.: 15/515,850

(22) PCT Filed: Sep. 30, 2015

(86) PCT No.: PCT/CN2015/091263
§ 371 (c)(1),
(2) Date: Mar. 30, 2017

(87) PCT Pub. No.: WO2016/050217
PCT Pub. Date: Apr. 7, 2016

(65) Prior Publication Data
US 2017/0297035 A1    Oct. 19, 2017

(30) Foreign Application Priority Data

Sep. 30, 2014 (CN) .......................... 2014 1 0523067
Sep. 30, 2014 (CN) .................... 2014 2 0576222 U
(Continued)

(51) Int. Cl.
*B03C 3/40*        (2006.01)
*F24F 3/16*        (2006.01)
(Continued)

(52) U.S. Cl.
CPC .............. *B03C 3/40* (2013.01); *B01D 53/323* (2013.01); *B03C 3/06* (2013.01); *B03C 3/08* (2013.01);
(Continued)

(58) Field of Classification Search
CPC ...... B01D 53/323; F24F 3/1603; F24F 3/166; B03C 3/06; B03C 3/08; B03C 3/366; B03C 3/40; B03C 3/47; B03C 3/49; B03C 3/70
(Continued)

(56) References Cited

U.S. PATENT DOCUMENTS 3,805,492 A * 4/1974 King ...................... F02M 27/04
                                                    123/537
7,569,094 B2 * 8/2009 Kane ...................... B01D 45/14
                                                     55/406
(Continued)

FOREIGN PATENT DOCUMENTS

CN    2418951 Y    2/2001
CN    2764478 Y    3/2006
(Continued)

OTHER PUBLICATIONS

PCT/CN2015/091263 English translation of the International Search Report & Written Opinion dated Dec. 30, 2015; 10 pages.
(Continued)

*Primary Examiner* — Frank M Lawrence, Jr.
(74) *Attorney, Agent, or Firm* — Lathrop Gage LLP

(57) ABSTRACT

Disclosed is a dust collection assembly (100), comprising a first annular ring (110), a second annular ring (120), an insulated spacer assembly (130) and an air guide (220), wherein the second annular ring (120) is arranged below the first annular ring (110); the insulated spacer assembly (130) is arranged between the first annular ring (110) and the
(Continued)

second annular ring (120), so that the first annular ring (110) is spaced apart from the second annular ring (120); the air guide (220) is formed as annular and sheathed outside the first annular ring (110) and/or the second annular ring (120); the air guide (220) is connected in a snap-fit with the first annular ring (110) and/or the second annular ring (120); and the external diameter of the upper end of the air guide (220) is greater than that of the lower end thereof. Further disclosed are an air purification device and an air conditioner comprising the dust collection assembly (100).

24 Claims, 22 Drawing Sheets

(30) Foreign Application Priority Data

| Sep. 30, 2014 | (CN) | 2014 2 0576282 U |
| Sep. 30, 2014 | (CN) | 2014 2 0576292 U |
| Nov. 28, 2014 | (CN) | 2014 1 0713668 |
| Nov. 28, 2014 | (CN) | 2014 2 0739437 U |
| Nov. 28, 2014 | (CN) | 2014 2 0739440 U |

(51) Int. Cl.

| *B03C 3/70* | (2006.01) |
| *B01D 53/32* | (2006.01) |
| *B03C 3/06* | (2006.01) |
| *B03C 3/08* | (2006.01) |
| *B03C 3/36* | (2006.01) |
| *B03C 3/47* | (2006.01) |
| *B03C 3/49* | (2006.01) |

(52) U.S. Cl.
CPC .............. *B03C 3/366* (2013.01); *B03C 3/47* (2013.01); *B03C 3/49* (2013.01); *B03C 3/70* (2013.01); *F24F 3/1603* (2013.01); *F24F 3/166* (2013.01)

(58) Field of Classification Search
USPC ...................... 96/15, 60, 61, 83, 88
See application file for complete search history.

(56) References Cited

U.S. PATENT DOCUMENTS

| 8,657,913 | B2* | 2/2014 | Pogen | B01D 45/14 |
| | | | | 55/400 |
| 2005/0028676 | A1 | 2/2005 | Heckel et al. | |
| 2005/0194583 | A1 | 9/2005 | Taylor et al. | |
| 2009/0266231 | A1* | 10/2009 | Franzen | B01D 45/14 |
| | | | | 95/68 |

FOREIGN PATENT DOCUMENTS

| CN | 2817970 Y | 9/2006 |
| CN | 101585015 A | 11/2009 |
| CN | 104566691 A | 4/2015 |
| CN | 204261810 U | 4/2015 |
| CN | 104613562 A | 5/2015 |
| CN | 104613563 A | 5/2015 |
| CN | 204329203 U | 5/2015 |
| CN | 104741240 A | 7/2015 |
| CN | 204478339 U | 7/2015 |
| CN | 204478404 U | 7/2015 |
| CN | 204544438 U | 8/2015 |
| GB | 850275 A | 10/1960 |
| GB | 1421959 A | 1/1976 |
| JP | 2005265483 A | 9/2005 |
| TW | 201113484 A | 4/2011 |

OTHER PUBLICATIONS

PCT/CN2015/091263 International Search Report & Written Opinion dated Dec. 30, 2015; 13 pages.

* cited by examiner

Y—Y

DUST COLLECTION ASSEMBLY, AIR PURIFICATION DEVICE AND AIR CONDITIONER

CROSS-REFERENCE TO RELATED APPLICATIONS

The present application is a national phase entry under 35 USC § 371 of International Application PCT/CN2015/091263, filed Sep. 30, 2015, which claims the benefit of and priority to Chinese Patent Application No. 201410523067.3, filed Sep. 30, 2014, Chinese Patent Application No. 201420576222.3, filed Sep. 30, 2014, Chinese Patent Application No. 201420576282.5, filed Sep. 30, 2014, Chinese Patent Application No. 201420576292.9, filed Sep. 30, 2014, Chinese Patent Application No. 201410713668.0, filed Nov. 28, 2014, Chinese Patent Application No. 201420739440.4, filed Nov. 28, 2014, Chinese Patent Application No. 201420739437.2, filed Nov. 28, 2014, the entire disclosures of which are incorporated herein by reference.

FIELD

The present disclosure relates to a technical field of home appliance, and specifically, to a dust collection assembly, an air purification device, and an air conditioner.

BACKGROUND

With industrial development, urban construction and an increase in vehicle use, dust increases and air pollution gets worse in outdoor environment, which causes the indoor air to get worse. On the other hand, decoration and smoking are also important reasons for the accumulation of harmful particulate matters in the indoor air. With the improvement of living standards, people's awareness about health increases gradually, higher requirements for an indoor air quality are put forward, so an air conditioner capable of removing PM2.5 is increasingly favored by consumers.

At present, a traditional air purification device mainly adopts a dense HEPA (High efficiency particulate air) filter net, and particles in the air are blocked to be absorbed by the net when flowing through the dense net. The shortcomings of this dense net are that it needs to be changed frequently as the meshes are easy to plug, and the electric motor of the purification product dedicated to support the use of the HEPA filter net has a large load because of the large loss of resistance, resulting in an increasing electricity consumption, and a loud noise.

SUMMARY

The present disclosure seeks to solve at least one of the technical problems existing in the related art to at least some extent.

Thus, a dust collection assembly is provided in the present disclosure which has advantages of a lower noise and high dust removal efficiency.

An air purification device is also provided in the present disclosure which has the dust collection assembly mentioned above.

An air conditioner is further provided in the present disclosure which has the dust collection assembly mentioned above.

A dust collection assembly is provided according to embodiments of a first aspect of the present disclosure, which includes: a first annular ring having a first outer ring and a plurality of first blades disposed in an inner surface of the first outer ring along a circumferential direction, in which the first annular ring has a first electrically connecting piece configured to be connected with one of a positive pole and a negative pole of a power source; a second annular ring having a second outer ring and a plurality of second blades disposed in an inner surface of the second outer ring along a circumferential direction, in which the second annular ring is disposed below the first annular ring, the plurality of second blades and the plurality of first blades are arranged to be staggered, and the second annular ring has a second electrically connecting piece configured to be connected with the other one of the positive pole and the negative pole of the power source; an insulation spacing assembly disposed between the first annular ring and the second annular ring and spacing the first annular ring and the second annular ring apart; and an air guide configured to have an annular shape and fitted over the first annular ring and/or the second annular ring, in which the air guide is connected with the first annular ring and/or the second annular ring by means of a snap, and an external diameter of an upper end of the air guide is larger than an external diameter of a lower end of the air guide.

With the dust collection assembly according to embodiments of the present disclosure, by disposing the air guide out of the first annular ring and/or the second annular ring, the airflow can be guided to a place where the first annular ring and the second annular ring are located, as which the dust removal efficiency of the dust collection assembly is improved. Meanwhile, through the air guide being snap-fitted with the first annular ring and/or the second annular ring, the assembly process is simplified and the assembly efficiency is improved.

According to some embodiments of the present disclosure, the air guide and the second outer ring are connected with a snap.

According to some embodiments of the present disclosure, the air guide has an air guide hook, an outer ring connecting terminal extends out of the second outer ring, and outer ring connecting terminal has a step face fitted with the air guide hook.

According to some embodiments of the present disclosure, the outer ring connecting terminal has an opening portion penetrating through the outer ring connecting terminal along an up-down direction, an inner wall of the opening portion is provided with a bent plate extending downward firstly and then being bent upward, and the step face is disposed to an outside surface of the bent plate.

According to some embodiments of the present disclosure, the air guide further includes a first extending plate extending upward, and the first extending plate is fitted within the opening portion and spaced apart from the bent plate.

According to some embodiments of the present disclosure, the air guide further includes a second extending plate extending upward, and the second extending plate and the first extending plate define an accommodating groove accommodating an outer end of the outer ring connecting terminal together.

According to some embodiments of the present disclosure, the air guide includes: a first wind guiding ring extending upward, archwise and gradually from inside to outside along a radial direction; and a second wind guiding ring connected at an upper end of the first wind guiding ring, in which an upper surface of the second wind guiding ring is in one plane.

According to some embodiments of the present disclosure, a shortest distance between the first annular ring and the second annular ring is larger than or equal to 2 mm.

According to some embodiments of the present disclosure, a distance between a first blade and an adjacent second blade is 2-40 mm.

According to some embodiments of the present disclosure, a thickness of the first blade along the circumferential direction of the first annular ring is larger than 0.5 mm, and a width of the first blade along an axial direction of the first annular ring is larger than 5 mm; and a thickness of the second blade along the circumferential direction of the second annular ring is larger than 0.5 mm, and a width of the second blade along an axial direction of the second annular ring is larger than 5 mm.

According to some embodiments of the present disclosure, both of the thicknesses of the first blade and the second blade are 1.5 mm, and both of the widths of the first blade and the second blade are 36 mm.

According to some embodiments of the present disclosure, the first outer ring is connected to an upper end of the plurality of first blades.

According to some embodiments of the present disclosure, the first outer ring is connected to an upper end of the plurality of first blades at a radially outer side of the plurality of first blades, and an upper surface of the plurality of first blades at the radially outer side is higher than an upper surface of the plurality of first blades at a radially inner side.

According to some embodiments of the present disclosure, the first annular ring further includes a first inner ring connected to the radially inner side of the plurality of first blades.

According to some embodiments of the present disclosure, the first annular ring further includes a first reinforcing ring connected to an inner surface of the first inner ring by means of a plurality of first reinforcing ribs arranged along a circumferential direction.

According to some embodiments of the present disclosure, a lower surface of the plurality of second blades at a radially outer side is higher than a lower surface of the plurality of second blades at a radially inner side.

According to some embodiments of the present disclosure, the second annular ring further includes a second inner ring connected to a lower end of the plurality of second blades at the radially inner side.

According to some embodiments of the present disclosure, the second annular ring further includes a second reinforcing ring connected to an inner surface of the second inner ring by means of a plurality of second reinforcing ribs arranged along a circumferential direction.

According to some embodiments of the present disclosure, the insulation spacing assembly includes at least one first insulation snap, and the first insulation snap is mounted to the first outer ring and the second outer ring so as to connect the first outer ring and the second outer ring in a spaced manner.

According to some embodiments of the present disclosure, a circumferential wall of the second outer ring is provided with a location column, and the first insulation snap includes: a first body having a height larger than or equal to 2 mm; at least two first snap joint feet, and the at least two first snap joint feet extend downward from a lower end of the first body and are fitted over the location column so as to connect the first body with the second outer ring; a first hook extending upward from an upper end of the first body and being snap-fitted with an edge of the first outer ring so as to connect the first body with the first outer ring.

According to some embodiments of the present disclosure, the location column is disposed at an intersection of the second outer ring and one of the plurality of second blades.

According to some embodiments of the present disclosure, an outside surface of the first body away from a center of the first outer ring is configured to be an arcuate face, three first snap joint feet are provided, and one of the three first snap joint feet is snapped-fitted with an outside of the second outer ring and an outer surface of the one first snap joint foot is flush with the arcuate face.

According to some embodiments of the present disclosure, the first annular ring further includes a first connecting terminal disposed to a radially outer side of the first outer ring, and the first electrically connecting piece is disposed on the first connecting terminal. The second annular ring further includes a second connecting terminal disposed to a radially outer side of the second outer ring and corresponding with the first connecting terminal in the up-down direction, and the second electrically connecting piece is disposed on the second connecting terminal. The insulation spacing assembly further includes a second insulation snap disposed between the first connecting terminal and the second connecting terminal.

According to some embodiments of the present disclosure, the first connecting terminal is provided with a first snap joint hole, and an resilient snap extends downward from a lower surface of the first connecting terminal; the second connecting terminal is provided with a second snap joint hole; the second insulation snap includes: a second body having a hollow interior, a height larger than or equal to 2 mm, and an opening in a top thereof as well as an opened bottom, wherein the resilient snap goes through the opening, stretches into and is snap-fitted within the second body, second snap joint feet extend outwards from two opposite sides of an outer surface of the second body, and the second snap joint feet abut against an upper surface of the second connecting terminal; a second hook extending downward from a side wall of the second body between two second snap joint feet so as to go through the second snap joint hole and be snap-fitted to a bottom surface of the second connecting terminal, the second hook abuts against a lower surface of the second connecting terminal; and a projection extending upwards from the top of the second body and goes through the first snap-joint hole.

According to some embodiments of the present disclosure, an external diameter of the first outer ring is smaller than or equal to an external diameter of the second outer ring.

According to some embodiments of the present disclosure, at least one of the first annular ring and the second annular ring is a high-internal-resistance annular ring, and a surface resistivity of the high-internal-resistance annular ring is $10^6 \sim 10^{12}$.

According to some embodiments of the present disclosure, the first blade includes a first blade body and a raised portion of the first blade protruding from one side edge of the first blade body, a side face of the raised portion of the first blade is flush with a side face of the first blade body, and the raised portion of the first blade is connected with the first outer ring, the second blade includes a second blade body and a raised portion of the second blade protruding from one side edge of the second blade body, a side face of the raised portion of the second blade is flush with a side face of the second blade body, and the raised portion of the second blade is connected with the second outer ring.

According to some embodiments of the present disclosure, in the circumferential direction of the first annular ring, the thickness of the first blade increases gradually from the radially inner side to the radially outer side, and thickness of the second blade increases gradually from the radially inner side to the radially outer side.

According to some embodiments of the present disclosure, the raised portion of the first blade is disposed at a place adjacent to an intersection point of two adjacent side edges of the first blade body; the raised portion of the second blade is disposed adjacent to an intersection point of two adjacent side edges of the second blade body.

According to some embodiments of the present disclosure, both the first blade and the second blade are configured to be flat plate, and both the first blade and the second blade are polygonal, oval or circular.

According to some embodiments of the present disclosure, both the first blade and the second blade are rectangular.

According to some embodiments of the present disclosure, both the first blade and the second blade are configured to be bent plate, and a shape of a cross-section of the first blade corresponds to a shape of a cross-section of the second blade in a direction perpendicular to the axial direction of the first annular ring.

According to some embodiments of the present disclosure, the shape of the cross-section of the first blade and the shape of the cross-section of the second blade are both formed to be curve shapes in the direction perpendicular to the axial direction of the first annular ring, and the first blade and the corresponding second blade have the same curvature radius.

According to some embodiments of the present disclosure, the cross-section of the first blade and the cross-section of the second blade are both arc.

According to some embodiments of the present disclosure, the plurality of first blades extend along a radial direction of the first annular ring and the plurality of second blades extend along a radial direction of the second annular ring.

According to some embodiments of the present disclosure, the plurality of first blades extend along a direction tilting relative to the radial direction of the first annular ring and the plurality of second blades extend along a direction tilted relative to the radial direction of the second annular ring.

According to some embodiments of the present disclosure, any two adjacent faces of the first annular ring are transited smoothly and any two adjacent faces of the second annular ring are transited smoothly.

An air purification device is provided according to embodiments of the second aspect of the present disclosure, which includes the dust collection assembly mentioned above.

With the air purification device according to embodiments of the present disclosure provided with the dust collection assembly mentioned above, the dust removal efficiency of air purification device can be improved, thus the product quality is promoted.

An air conditioner is provided according to embodiments of the third aspect of the present disclosure, which includes a casing having an air channel, in which the air channel has an air inlet and an air outlet; and the dust collection assembly mentioned above, in which the dust collection assembly is disposed in the air channel and located in a position adjacent to the air inlet or the air outlet.

With the air conditioner according to embodiments of the present disclosure provided with the dust collection assembly mentioned above, the dust removal efficiency of air purification device can be improved, thus the product quality is promoted.

According to some embodiments of the present disclosure, the air conditioner further includes a negative ion emission and ionization device disposed in the air channel.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
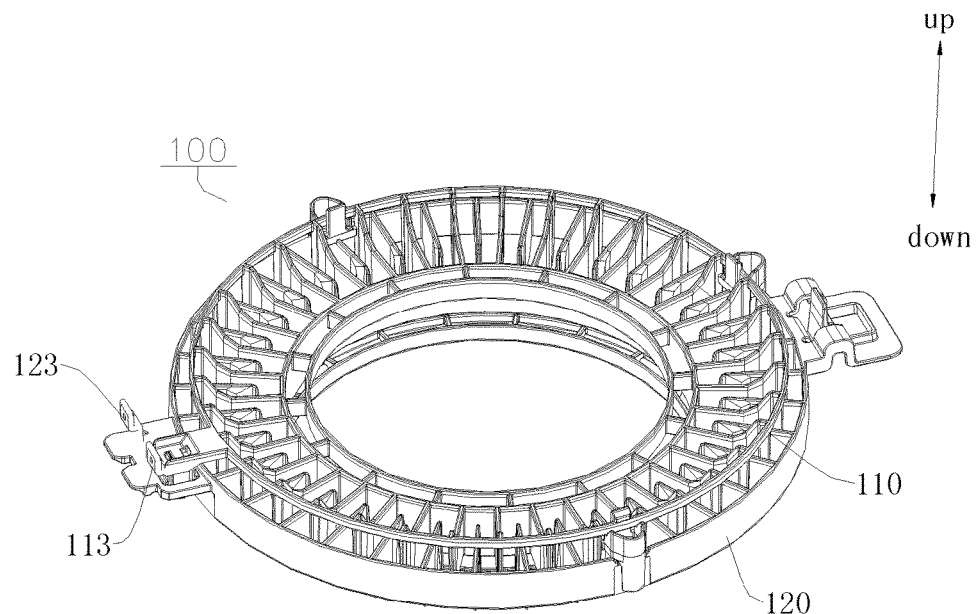
FIG. 1 is a perspective view of a dust collection assembly according to an embodiment of the present disclosure.

REFERENCE NUMERALS dust collection assembly 100,
first annular ring 110,
first outer ring 111, first blade 112, first blade body 1121, raised portion 1122 of the first blade, first electrically connecting piece 113, first inner ring 114,
first reinforcing ring 115, first reinforcing rib 116,
first connecting terminal 117, first snap joint hole 1171, resilient snap 1172,
second annular ring 120,
second outer ring 121, location column 1211,
second blade 122, second blade body 1221, raised portion 1222 of the second blade, second electrically connecting piece 123, second inner ring 124, second reinforcing ring 125,
second reinforcing rib 126, second connecting terminal 127, second snap-joint hole 1271,
outer ring connecting terminal 128, step face 1281, opening portion 1282, bent plate 1283,
insulation spacing assembly 130,
first insulation snap 131, first body 1311, first snap-joint foot 1312, first hook 1313,
stiffening rib 1314, through hole 1315, first segment 1316, second segment 1317, connecting segment 1318,
second insulation snap 132, second body 1321, second snap joint foot 1322,
second hook 1323, projection 1324, opening 1325, guiding arcuate face 1326, guiding portion 1327, guiding slope 1328,
air guide 220,
first wind guiding ring 221, second wind guiding ring 222, third hook 223, plate body 2231, hook protrusion 2232,
first extending plate 224, second extending plate 225, accommodating groove 226,
high voltage power source 500.

DETAILED DESCRIPTION

Embodiments of the present disclosure will be described in detail in the following. Examples of the embodiments are shown in the drawings, and the same or similar elements and the elements having same or similar functions are denoted by like reference numerals throughout the descriptions. The embodiments described with reference to the drawings are illustrative, which is only used to explain the present disclosure and shouldn't be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise" "axial direction," "radial direction," and "circumferential direction" should be construed to refer to the orientation as then described or as shown in the drawings under discussion. These relative terms are for convenience of description and do not require that the present invention be constructed or operated in a particular orientation, thus cannot be construed to limit the present disclosure. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," should be understood broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

A dust collection assembly 100 according to embodiments of the present disclosure will be described in detail with reference to FIG. 1 to FIG. 39.

As shown in FIG. 1-FIG. 4, the dust collection assembly 100 according to embodiments of the present disclosure includes: a first annular ring 110, a second annular ring 120, an insulation spacing assembly 130 and an air guide 220.

Figure 2:
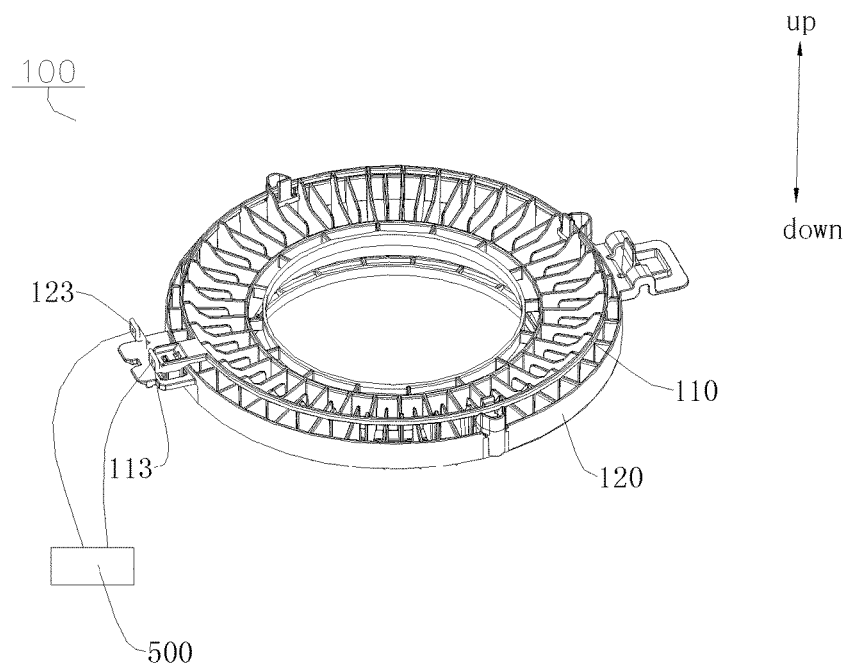
FIG. 2 is a schematic view of the dust collection assembly in FIG. 1 connected with a high voltage power source.

As shown in FIG. 2, during the use of the dust collection assembly 100, it can be connected with a power source (for example a high voltage power source 500), a high potential terminal of the high voltage power source 500 is electrically connected with one of the first annular ring 110 and the second annular ring 120, a low potential terminal of the high voltage power source 500 is electrically connected with the other one. For example, in an example of the present disclosure, the high potential terminal is electrically connected with the first annular ring 110 by means of the first electrically connecting piece 113 and the low potential terminal is electrically connected with the second annular ring 120 by means of the second electrically connecting piece 123. When the first annular ring 110, the second annular ring 120 and the high voltage power source 500 are switched on, a high voltage direct current field is formed between any two adjacent faces of the spaced first annular ring 110 and second annular ring 120.

It should be illustrated that, a gas molecule in the air is ionized in the high voltage direct current field, a large amount of electrons and ions are produced and move toward two poles under the function of the electric filed force. The electrons and ions come up against the dust particles and bacteria in the airflow and make them charged in the movement. The charged particles move to a polar plate in a direction opposite to a component of direction of the airflow under the function of the electric field. Under the function of the electric filed, free ions in the air move towards the two poles. The higher the voltage, the higher the electric field intensity, and the faster the movement speed of the ions. As the movement of the ions, current forms between the poles. At first, the free ions in the air are few, and the current is small. When the voltage rises to a certain value, the ions nearby the discharge pole gains higher energy and speed, and when these ions strike neutral atoms in the air, the neutral atoms are divided into positive and negative ions, which is called air ionization. When the air is ionized, a chain reaction occurs, which makes the number of the ions moving between the poles increases, achieving a sharply increasing current between the poles (which is called corona current). Thus, the air becomes a conductor, the accompanied bacteria particles are captured by the high and intense voltage, a cell wall made of protein is broken down by the instantaneously conductive phenomenon, as which the purposes of killing bacteria and absorbing and removing dust are realized.

Specifically, the first annular ring 110 has a first outer ring 111 and a plurality of first blades 112 disposed on an inner surface of the first outer ring 111 along a circumferential direction of the first annular ring 110. In an example of the present disclosure, the first blade 112 is formed to be a sheet and extends along a radial direction of the first outer ring 111. The second annular ring 120 has a second outer ring 121 and a plurality of second blades 122 disposed on an inner surface of the second outer ring 121 along a circumferential direction of the second annular ring 120. As shown in FIG. 1-FIG. 4, the second annular ring 120 is disposed below the first annular ring 110, and the plurality of second blades 122 and the plurality of first blades 112 are arranged to be staggered in the circumferential direction. Thus, a plurality of high voltage direct current fields can be formed between the first annular ring 110 and the second annular ring 120, improving the dust removal efficiency of the dust collection assembly 100.

In addition, an air flow channel is formed between the first blade 112 and the adjacent second blade 122, and the first blade 112 and the second blade 122 arranged to be staggered in the circumferential direction has a function to rectify the airflow passing through the dust collection assembly 100, which enhances the uniformity of the airflow, and further reduces the inlet pressure and flow resistance of the airflow, so the noise produced by flowing air is decreased.

The first annular ring 110 has a first electrically connecting piece 113 configured to be connected with one of a positive pole and a negative pole of a power source, the second annular ring 120 has a second electrically connecting piece 123 configured to be connected with the other one of the positive pole and the negative pole of the power source. Thus, with the first electrically connecting piece 113 and the second electrically connecting piece 123, it is guaranteed that the first annular ring 110 and the second annular ring 120 are in reliable connection with the high voltage power source 500. When the dust collection assembly 100 is connected with the high voltage power source 500, the dust and particulate matters in the airflow flowing through the first annular ring 110 and the second annular ring 120 will be captured by the high voltage direct current field, and absorbed to the surface of the first annular ring 110 or the surface of the second annular ring 120, thus the purpose of de-dusting is realized.

The insulation spacing assembly 130 is disposed between the first annular ring 110 and the second annular ring 120 and spaces the first annular ring 110 and the second annular ring 120 apart. In other words, the insulation spacing assembly 130 is supported between the first annular ring 110 and the second annular ring 120 so as to make any point of the first annular ring 110 not in direct contact with the second annular ring 120. Thus, it is guaranteed that a high voltage electric field can be formed between a face of the first annular ring 110 and an adjacent face of the second annular ring 120 during the use of the dust collection assembly 100, so that the dust collection assembly 100 can collect dust and sterilize air. According to an embodiment of the present disclosure, the insulation spacing assembly 130 is detachably connected with the first annular ring 110 as well as the second annular ring 120, as which it is convenient for the users to swept and clean the dust collection assembly 100 when the dust collection assembly 100 needs cleaning.

Accordingly, with the plurality of second blades 122 and the plurality of first blade 112 arranged to be staggered in the circumferential direction, the plurality of high voltage direct current fields can be formed between the first annular ring 110 and the second annular ring 120 to improve the dust removal efficiency of the dust collection assembly 100. In addition, the plurality of first blades 112 and the plurality of second blades 122 have a function to rectify the airflow passing through the dust collection assembly 100, which enhances the uniformity of the airflow, further reduces the inlet pressure and flow resistance of the airflow, so the noise produced by flowing air is decreased.

The air guide 220 is configured to have an annular shape and be fitted over the first annular ring 110 and/or the second annular ring 120, in which an external diameter of an upper end of the air guide 220 is larger than an external diameter of a lower end of the air guide 220. Thus, the airflow can be guided to places where the first annular ring 110 and the second annular ring 120 are located, as which the dust removal efficiency of the dust collection assembly 100 is improved. In addition, the air guide 220 is connected with the first annular ring 110 and/or the second annular ring 120 by means of a snap, as which the assembly process of the dust collection assembly 100 is simplified and the assembly efficiency is improved.

With the dust collection assembly 100 according to embodiments of the present disclosure, by disposing the air guide 220 out of the first annular ring 110 and/or the second annular ring 120, the airflow can be guided to the places where the first annular ring 110 and the second annular ring 120 are located, as which the dust removal efficiency of the dust collection assembly 100 is improved. Meanwhile, the air guide 220 is made snap-fitted with the first annular ring 110 and/or the second annular ring 120, the assembly process is simplified and the assembly efficiency is improved.

Meanwhile, by making the plurality of second blades 122 staggered from the plurality of first blades 112 in the circumferential direction, not only the plurality of high voltage direct current fields are formed between the first annular ring 110 and the second annular ring 120, the effective area of the high voltage direct current fields is also enlarged, as which the dust removal efficiency of the dust collection assembly 100 is improved. In addition, the plurality of first blades 112 and the plurality of second blades 122 have a function to rectify the airflow passing through the dust collection assembly 100, which enhances the uniformity of the airflow, further reduces the inlet pressure and flow resistance of the airflow, so the noise produced by flowing air is decreased.

Figure 3:
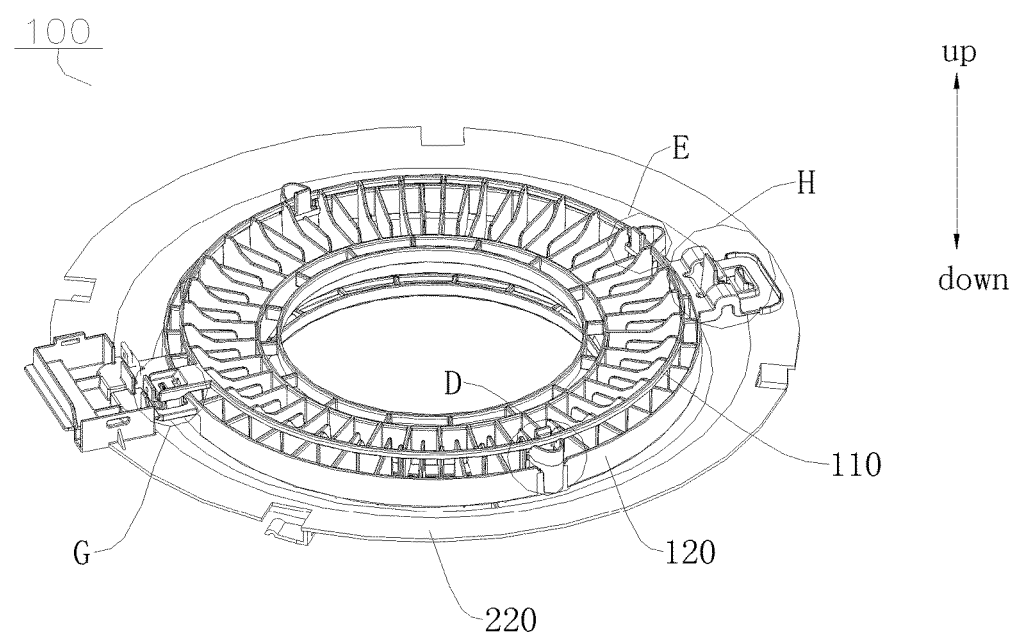
FIG. 3 is a perspective view of an air purification device according to an embodiment of the present disclosure.
Figure 4:
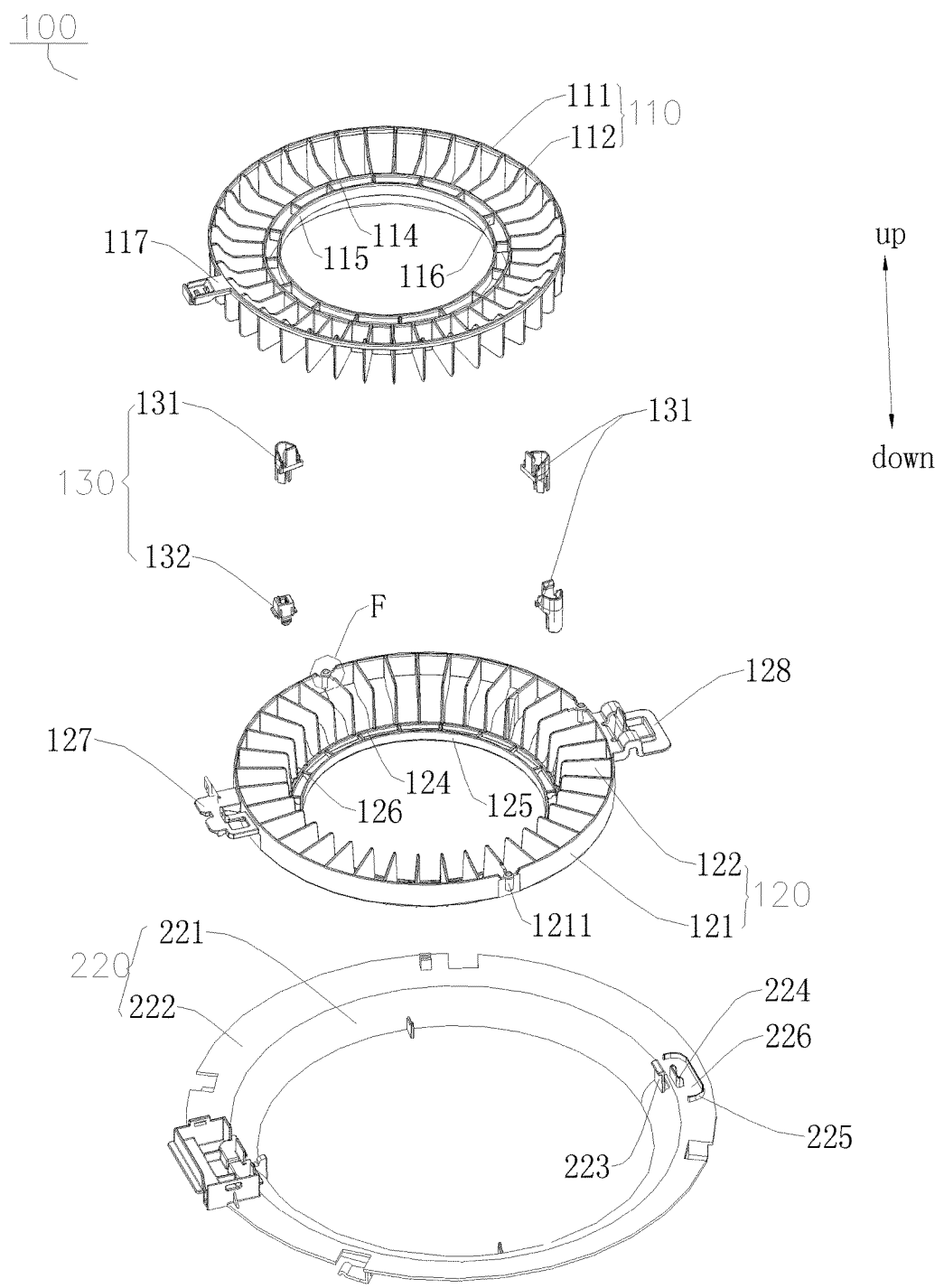
FIG. 4 is an exploded schematic view of the air purification device in FIG. 3.

In an example of the present disclosure, as shown in FIG. 3-FIG. 4, the air guide 220 is connected with the second outer ring 121. Thus, it is convenient for the connection between the air guide 220 and the second annular ring 120. In examples shown in FIG. 30-FIG. 34, the air guide 220 is provided with an air guide hook 223, an outer ring connecting terminal 128 extends out of the second outer ring 121, and the outer ring connecting terminal 128 has a step face 1281 fitted with the air guide hook 223. With the air guide hook 223 abutting against the step face 1281, the displacement of the outer ring connecting terminal 128 along the up-down direction (an up-down direction shown in FIG. 34) is limited.

Figure 11:
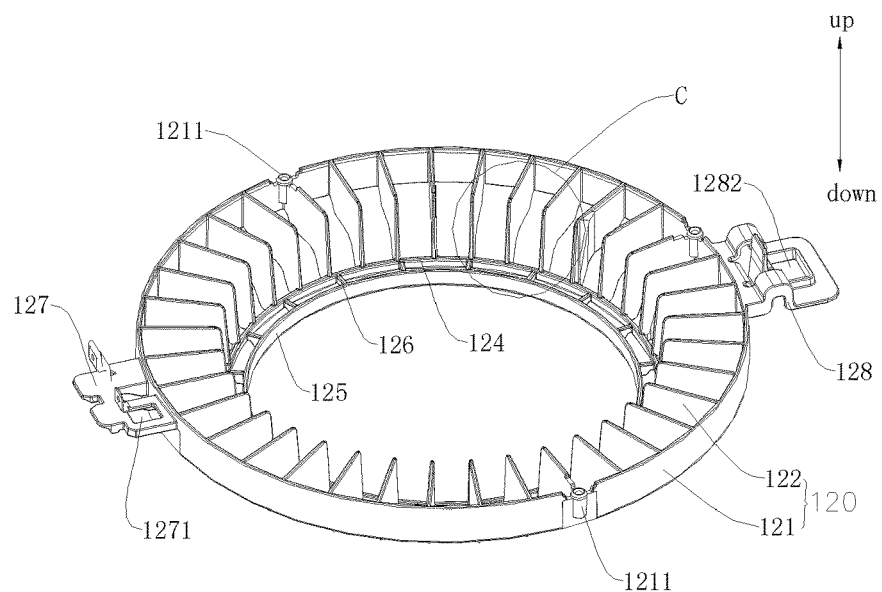
FIG. 11 is a perspective view of a second annular ring in FIG. 4.
Figure 34:
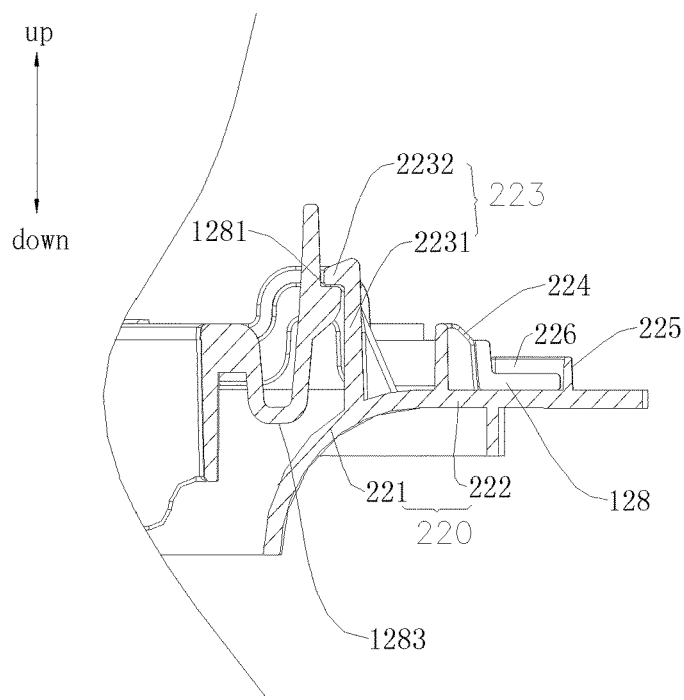
FIG. 34 is a sectional view of FIG. 33 along Y-Y direction.

As shown in FIG. 11 and FIG. 34, the outer ring connecting terminal 128 has an opening portion 1282 penetrating through the outer ring connecting terminal 128 along an up-down direction (an up-down direction shown in FIG. 11), an inner wall of the opening portion 1282 is provided with a bent plate 1283 which extends downward firstly and then is bent upward, and the step face 1281 is disposed to an outside surface of the bent plate 1283. It should be understood that, in the radial direction of the second outer ring 121, the bent plate 1283 is resilient, and the air guide hook 223 includes a plate body 2231 extending upwards along the axial direction of the air guide 220 and a hook protrusion 2232 above the plate body 2231 and protruding towards the bent plate 1283. During the assembling, the outer ring connecting terminal 128 is mounted from up to down, a lower portion of the step face 1281 abuts against the hook protrusion 2232 of the air guide hook 223 firstly, and the bent plate 1283 deforms inwards along the radial direction of the second outer ring 121. When the step face 1281 abuts against the lower end face of the hook protrusion 2232, the bent plate 1283 recovers outwards along the radial direction of the second outer ring 121. At this time, the hook protrusion 2232 is snap-fitted with the bent plate 1283. Thus, the assembly process of the air guide 220 and the second annular ring 120 is simplified and the connection reliability of the air guide 220 and the second annular ring 120 is improved.

Figure 32:
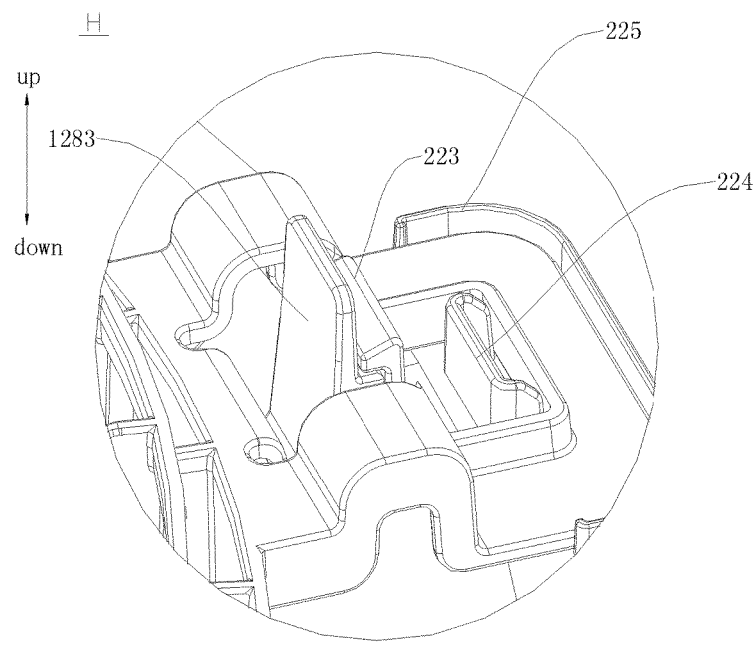
FIG. 32 is a partial enlarged view of area H in FIG. 3.
Figure 33:
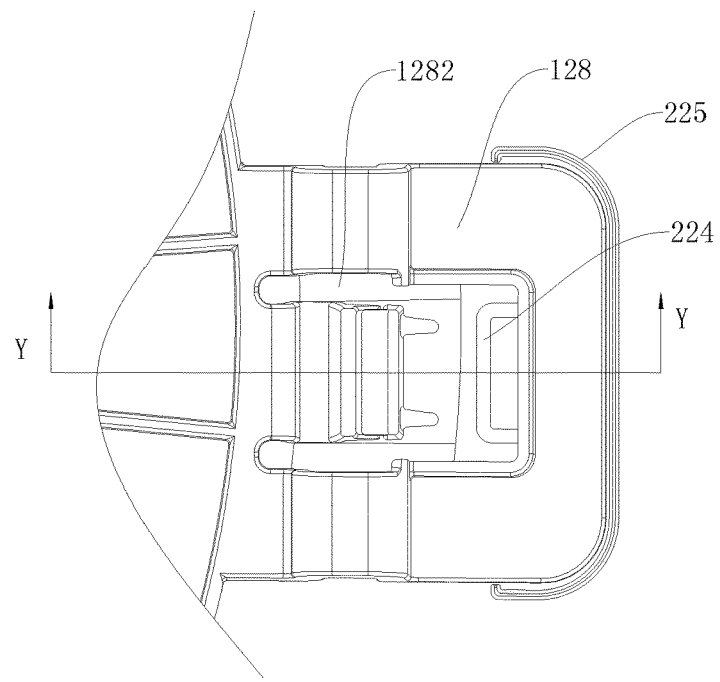
FIG. 33 is the partial enlarged view of the fitting place between the outer ring connecting terminal and the air guide in FIG. 32 in another perspective.

Further, as shown in FIG. 4, the air guide 220 is further provided with a first extending plate 224 extending upward and the first extending plate 224 is fitted within the opening portion 1282 and spaced apart from the bent plate 1283 so as to limit a movement of the outer ring connecting terminal 128 along a circumferential direction of the air guide 220. Furthermore, as shown in FIG. 4 and FIG. 32, the air guide 220 is further provided with a second extending plate 225 extending upward and the second extending plate 225 and the first extending plate 224 define an accommodating groove 226 accommodating an outer end of the outer ring connecting terminal 128 together. Thus, the connection reliability between the outer ring connecting terminal 128 and the air guide 220 can be improved further.

According to some embodiments of the present disclosure, as shown in FIG. 4, the air guide 220 may include: a first wind guiding ring 221 and a second wind guiding ring 222. Specifically, the first wind guiding ring 221 extends upward, archwise and gradually from inside to outside along a radial direction. For example, in an example as shown in FIG. 4, the internal diameter of the first wind guiding ring 221 increases gradually from down to up (an up-down direction shown in FIG. 4). The second wind guiding ring 222 is connected at an upper end of the first wind guiding ring 221, in which an upper surface of the second wind guiding ring 222 is in the same plane. At least a portion of the second annular ring 120 is located within the first wind guiding ring 221, and the second annular ring 120 is snap-fitted with the second wind guiding ring 222. Thus, more airflow is guided into the dust collection assembly 100, and the operation efficiency of the dust collection assembly 100 is further improved.

According to an embodiment of the present disclosure, a shortest distance between the first annular ring 110 and the second annular ring 120 is larger than or equal to 2 mm. In other words, any point on the first annular ring 110 is away from the second annular ring 120 by larger than or equal to 2 mm. Thus, during use of the dust collection assembly 100, air can be prevented from being broken down, discharge and short circuit can be prevented effectively, so that the operation stability of the dust collection assembly 100 is improved and the security coefficient and dust removal effect are guaranteed. According to an embodiment of the present disclosure, a distance between the first blade 112 and the adjacent second blade 122 is 2-40 mm. Thus, during the use of the dust collection assembly 100, air can be prevented from being broken down, and discharge and short circuit can be prevented, so that the operation stability of the dust collection assembly 100 is improved more and the security coefficient and dust removal effect are guaranteed. Meanwhile, hurts can be prevented if someone stretches his finger into a gap between the first blade 112 and the second blade 122 by mistake.

Figure 6:
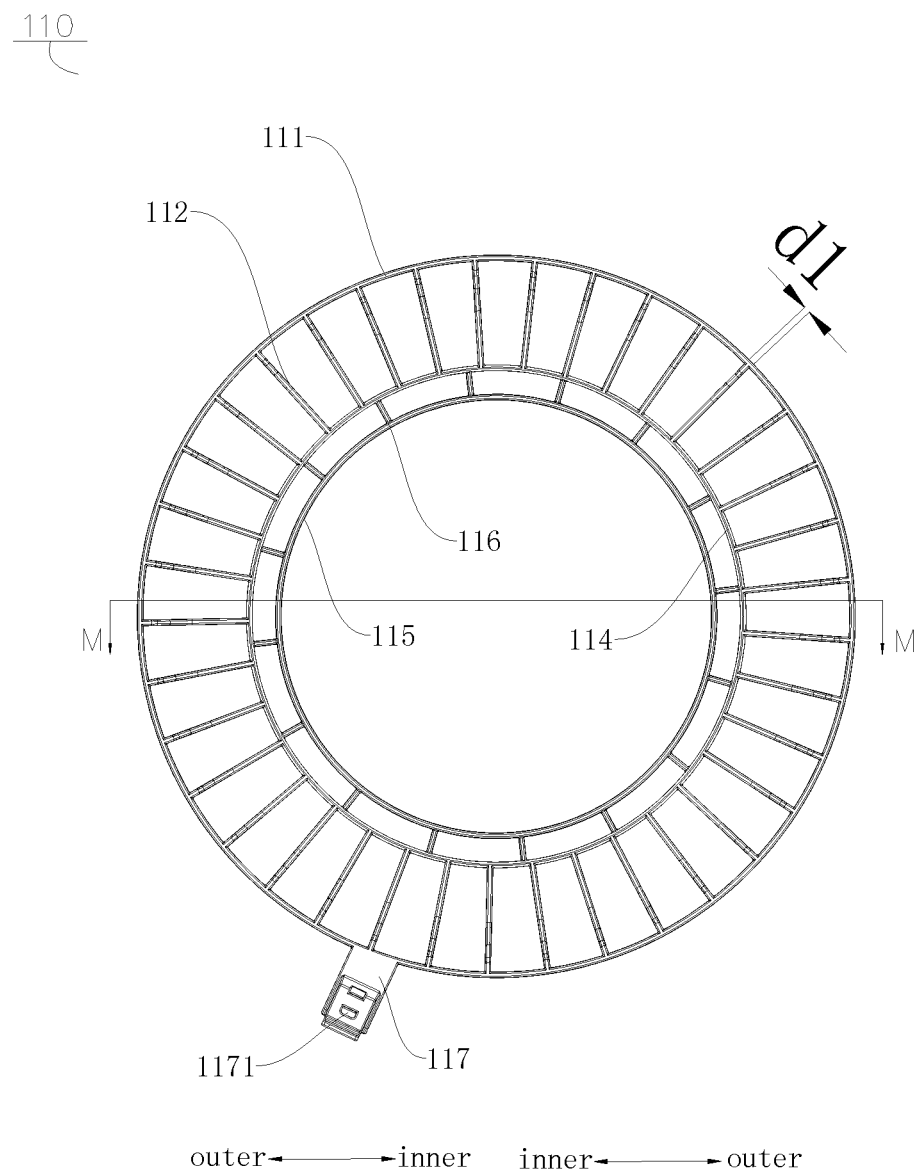
FIG. 6 and FIG. 7 are a front view and a right view of the first annular ring in FIG. 5 respectively.
Figure 8:
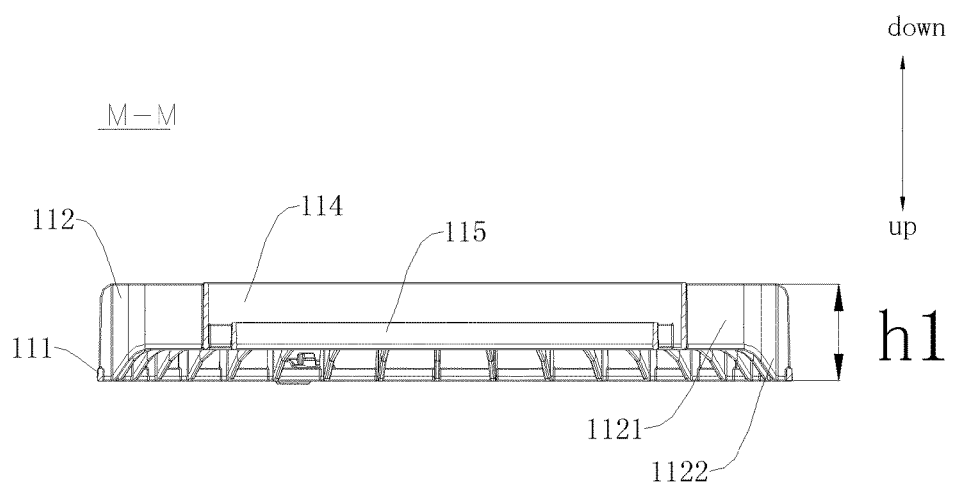
FIG. 8 is a sectional view of FIG. 6 along M-M direction.
Figure 12:
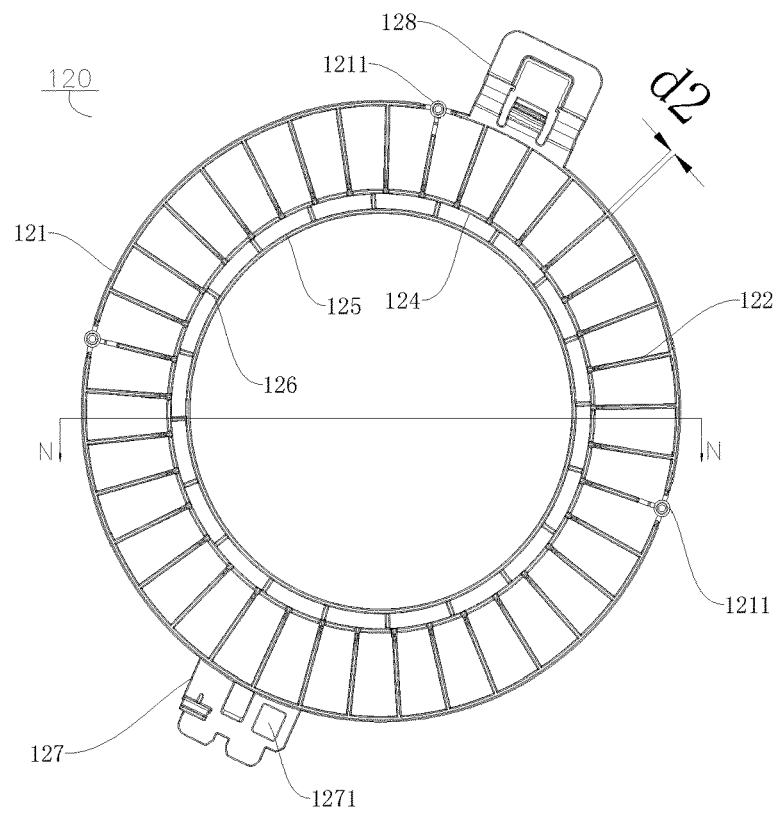
FIG. 12 and FIG. 13 are a front view and a right view of the second annular ring in FIG. 11 respectively.
Figure 14:
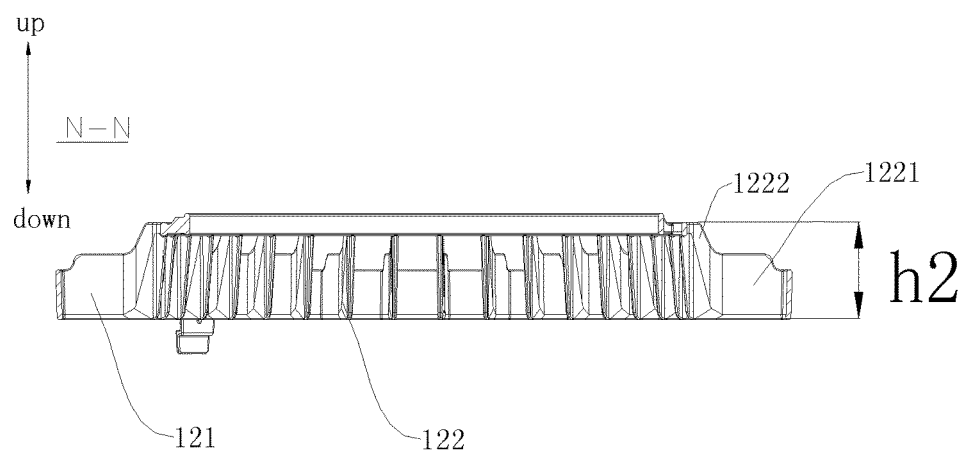
FIG. 14 is a sectional view of FIG. 12 along N-N direction.
Figure 15:
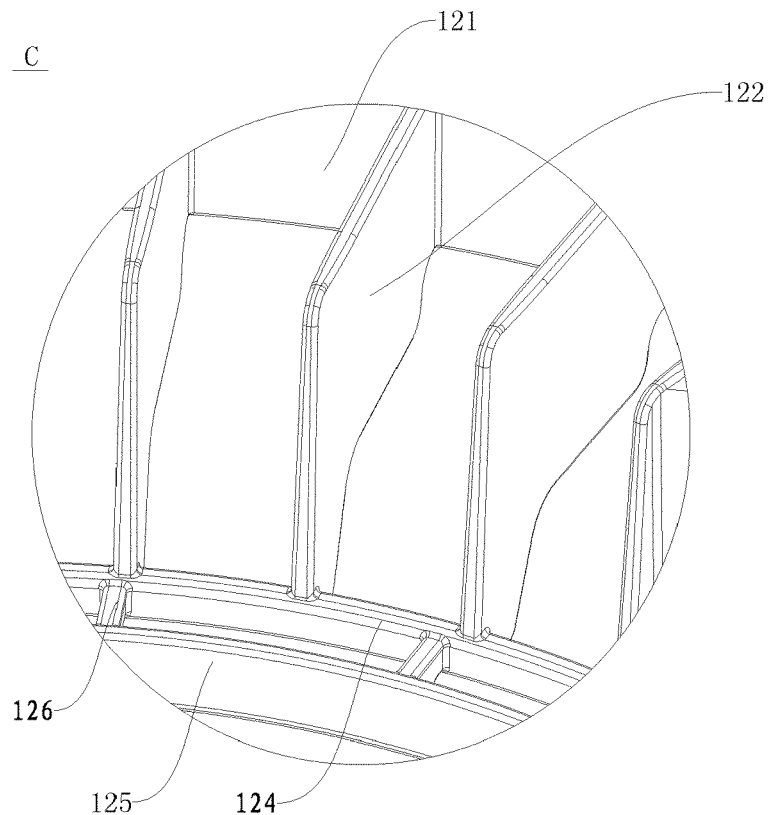
FIG. 15 is a partial enlarged view of area C in FIG. 11.
Figure 16:
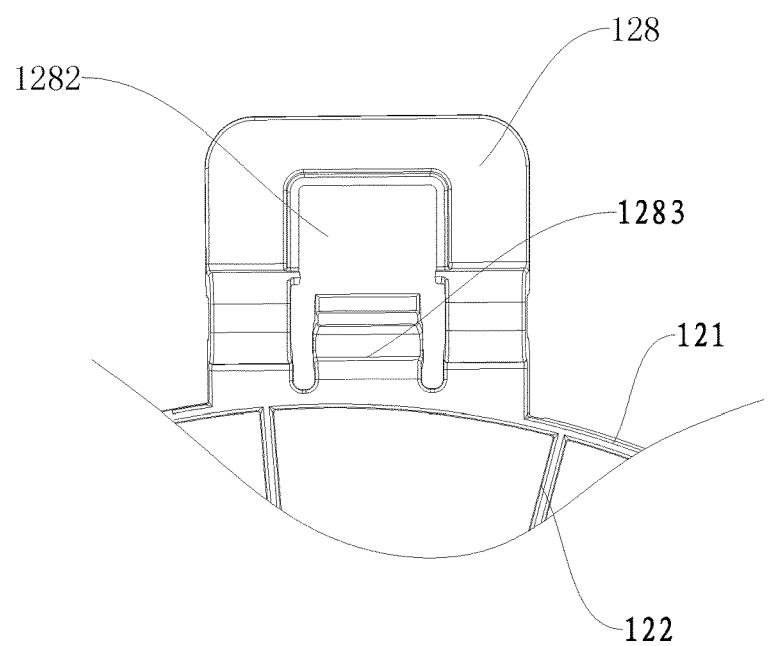
FIG. 16 is a partial enlarged view of FIG. 11.
Figure 17:
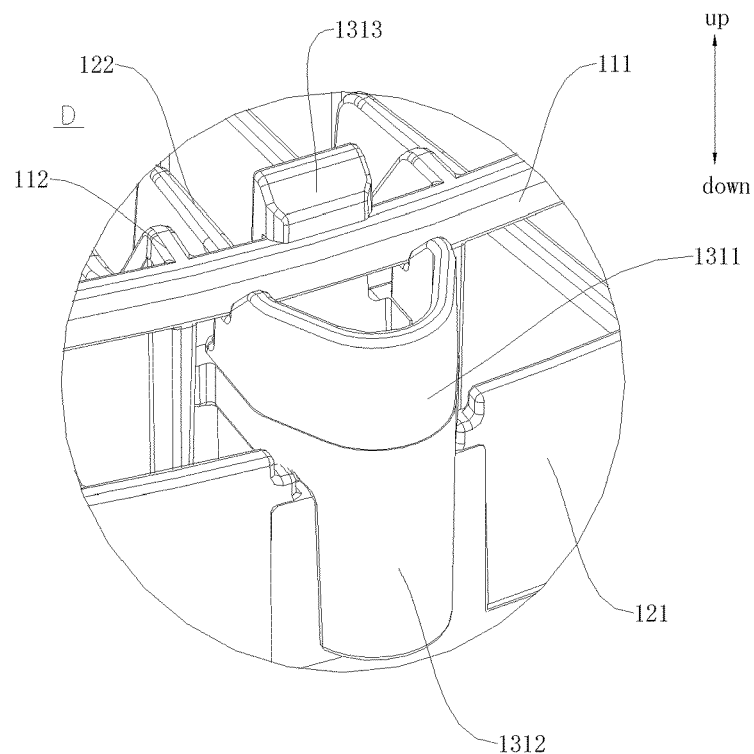
FIG. 17 and FIG. 18 are partial enlarged views of areas D and E in FIG. 3 respectively.
Figure 18:
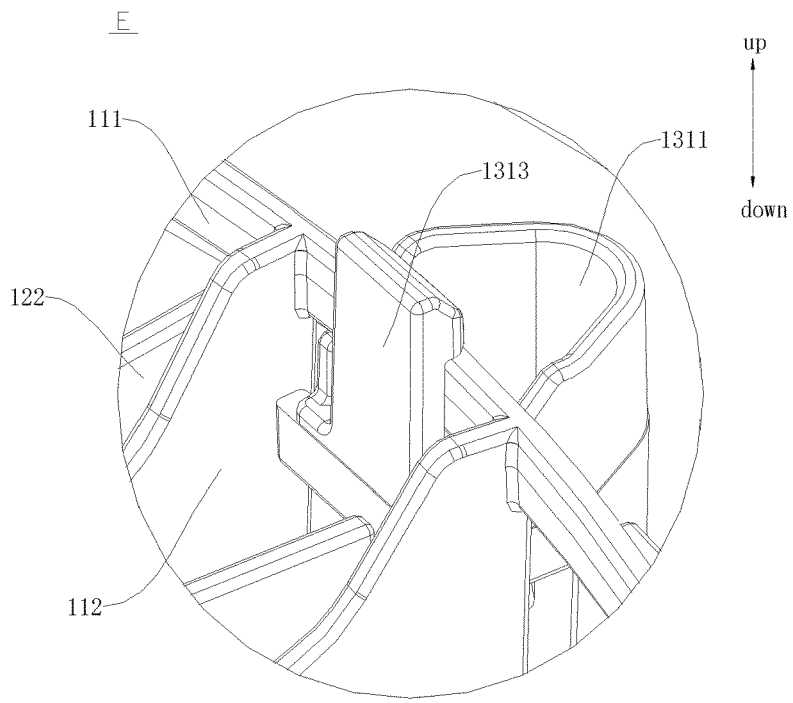
Figure 19:
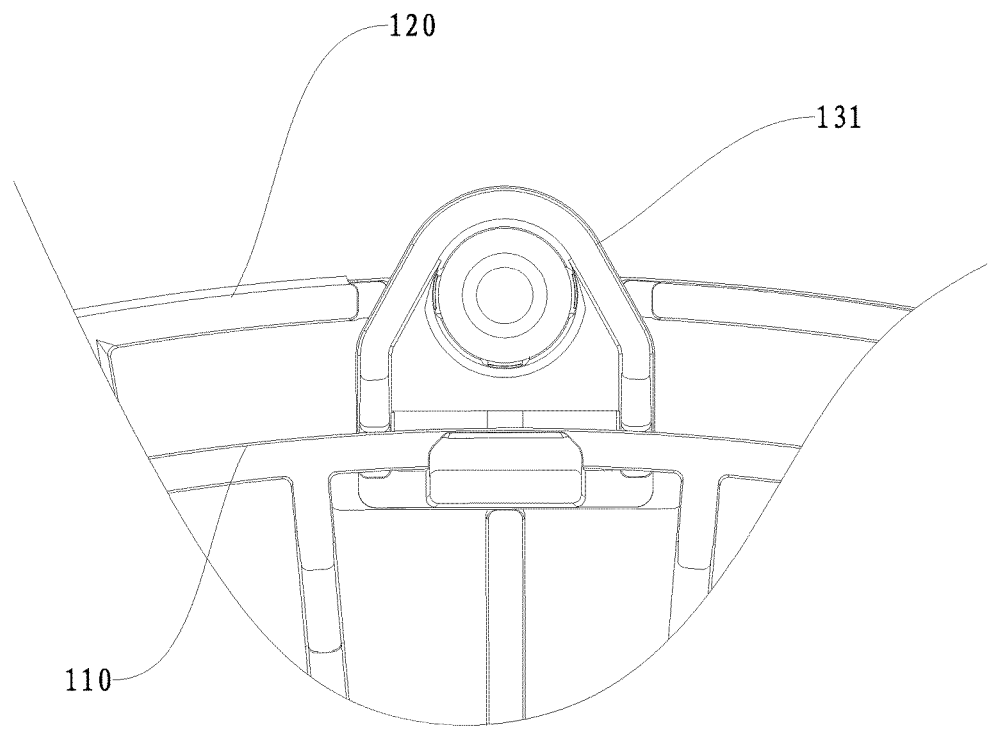
FIG. 19 and FIG. 20 are partial enlarged views of FIG. 1, in which the first insulation snap is fitted with the first annular ring and the second annular ring.
Figure 20:
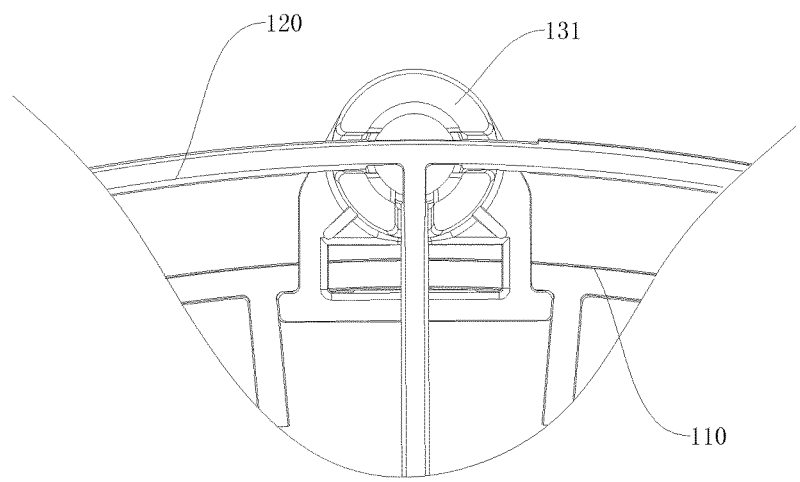

In an example of the present disclosure, as shown in FIG. 6, a thickness of the first blade 112 along the circumferential direction of the first annular ring 110 is larger than 0.5 mm, i.e. d1>0.5 mm. As shown in FIG. 8, a width of the first blade 112 along an axial direction of the first annular ring 110 is larger than 5 mm, i.e. h1>5 mm. As shown in FIG. 12, a thickness of the second blade 122 along the circumferential direction of the second annular ring 120 is larger than 0.5 mm, i.e. d2>0.5 mm. As shown in FIG. 14, a width of the second blade 122 along an axial direction of the second annular ring 120 is larger than 5 mm, i.e. h2>5 mm. Thus, the purification effect of the dust collection assembly 100 is guaranteed, the purification efficiency of the dust collection assembly 100 is improved, and the structure of the dust collection assembly 100 is simplified, which makes the structure of the dust collection assembly 100 more compact and reasonable.

Figure 5:
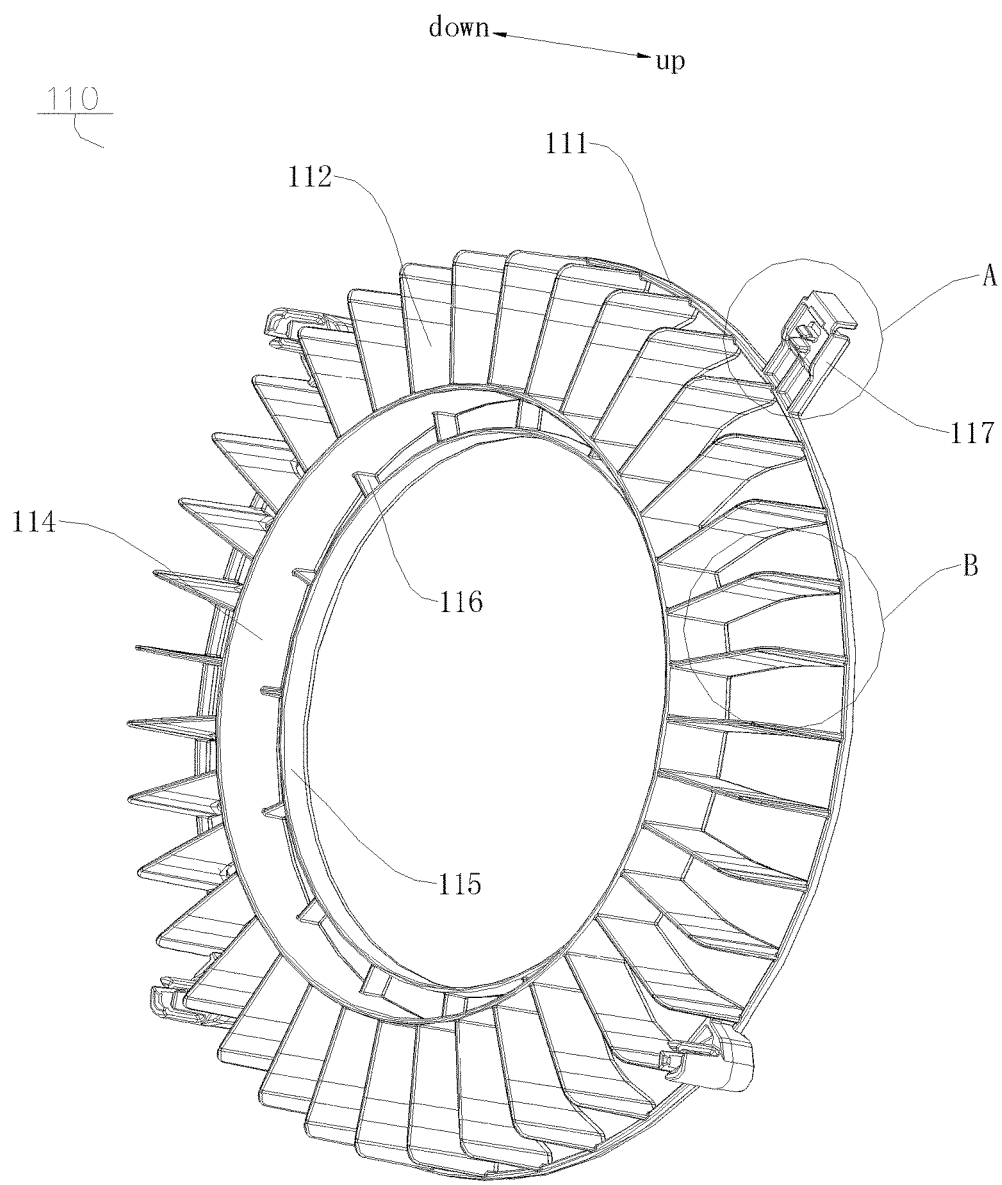
FIG. 5 is a perspective view of a first annular ring in FIG. 4.

Considering that the first annular ring 110 is located above the second annular ring 120, in order to guarantee that the first outer ring 111 is spaced apart from the second annular ring 120, in an example shown in FIG. 5, the first outer ring 111 is connected to an upper end (an up-down direction shown in FIG. 5) of the first blade 112, thus making the dust collection assembly 100 have a more compact and reasonable structure.

Figure 7:
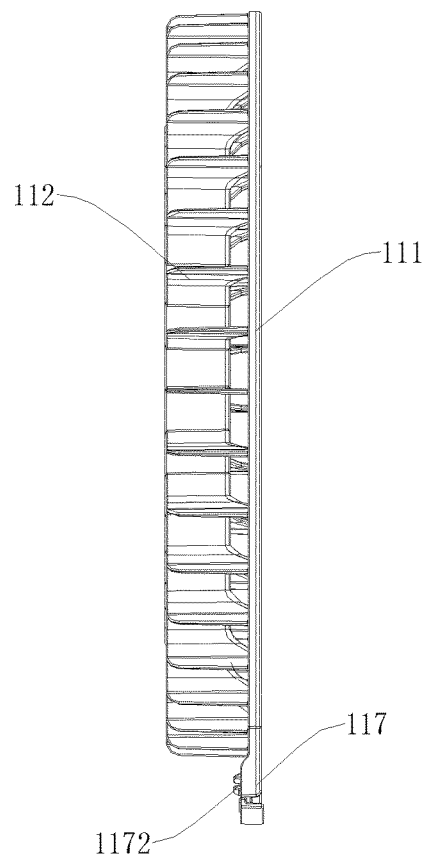

Further, as shown in FIG. 5, FIG. 6, FIG. 8 and FIG. 10, the first outer ring 111 is connected to an upper end of the plurality of first blades 112 at a radially outer side of the plurality of first blade s112, and an upper surface of the first blade 112 at the radially outer side is higher than an upper surface of the first blade 112 at a radially inner side. In other words, in the axial direction of the first annular ring 110, the width of the first blade 112 at the radially outer side is larger than the width of the first blade 112 at the radially inner side. Thus, the compactness of the dust collection assembly 100 is improved. Furthermore, as shown in FIG. 5 and FIG. 7, the lower surfaces of the plurality of first blades 112 are flush with each other and located in a same plane.

In examples shown in FIG. 5-FIG. 10, the first annular ring 110 may further include a first inner ring 114. The first inner ring 114 is connected to the radially inner side of the plurality of first blades 112. Thus, the structure of the first annular ring 110 is more stable. Further, as shown in FIG. 5-FIG. 6, the first annular ring 110 further includes a first reinforcing ring 115. The first reinforcing ring 115 is connected to an inner surface of the first inner ring 114 by means of a plurality of first reinforcing ribs 116 arranged along a circumferential direction. Thus, a structural strength of the first annular ring 110 can be enhanced further.

Similarly, in examples shown in FIG. 11-FIG. 15, a lower surface of the second blade 122 at a radially outer side is higher than a lower surface of the second blade 122 at a radially inner side. In other words, in the axial direction of the second annular ring 120, the width of the second blade 122 at the radially outer side is less than the width of the second blade 122 at the radially inner side. The second outer ring 121 is connected to the radially outer side of the plurality of second blades 122. When the second annular ring 120 is fitted with the first annular ring 110, the corresponding area of the first blade 112 and the adjacent second blade 122 increases further, as which the area of the high voltage direct current field formed between the first blade 112 and adjacent second blade 122 increases, thus the dust removal efficiency of the dust collection assembly 100 is improved. Meanwhile, the compactness of the dust collection assembly 100 can be improved further. Furthermore, as shown in FIG. 5 and FIG. 7, the upper surfaces of the plurality of second blades 122 are flush with each other and located in a same plane.

In examples shown in FIG. 11-FIG. 15, the second annular ring 120 may further include a second inner ring 124. The second inner ring 124 is connected to a lower end of the plurality of second blades 122 at the radially inner side. Thus, the structure of the second annular ring 120 is more stable. Further, as shown in FIG. 11-FIG. 15, the second annular ring 120 may further include a second reinforcing ring 125. The second reinforcing ring 125 is connected to an inner surface of the second inner ring 124 by means of a plurality of second reinforcing ribs 126 arranged along a circumferential direction. Thus, a structural strength of the second annular ring 120 can be enhanced further.

As shown in FIG. 4, FIG. 17-FIG. 27, according to an embodiment of the present disclosure, the insulation spacing assembly 130 includes at least one first insulation snap 131. The first insulation snap 131 is mounted to the first outer ring 111 and the second outer ring 121 so as to connect the first outer ring 111 and the second outer ring 121 in a spaced manner. Thus, any point on the first annular ring 110 can be kept away from the second annular ring 120 by a certain distance so as to prevent air between the first annular ring 110 and the second annular ring 120 from being broken down and prevent discharge in the operation state of the dust collection assembly 100, as a result the stability and security of the dust collection assembly 100 are guaranteed. In addition, by making the first insulation snap 131 connect the first outer ring 111 and the second outer ring 121 in a spaced manner, the assembly process of the dust collection assembly 100 is simplified, the assembly efficiency is improved, and the production cost is reduced.

Figure 13:
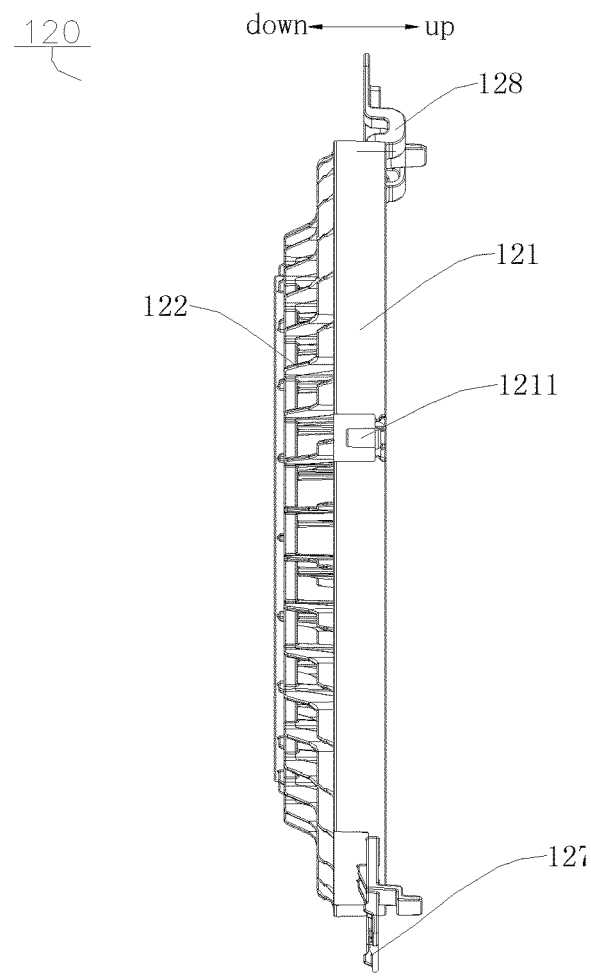

In examples shown in FIG. 11-FIG. 13, a circumferential wall of the second outer ring 121 is provided with a location column 1211 to facilitate connection between the first insulation snap 131 and the second outer ring 121. In addition, as shown in FIG. 22-FIG. 26, the first insulation snap 131 includes a first body 1311, at least two first snap joint feet 1312 and a first hook 1313. The first body 1311 has a height larger than or equal to 2 mm in the up-down direction, thus, it is guaranteed that the distance between the first outer ring 111 and the second outer ring 121 is larger than or equal to 2 mm so that the air can be prevent from being broken down and the air discharges are prevented between the first outer ring 111 and the second outer ring 121.

Figure 24:
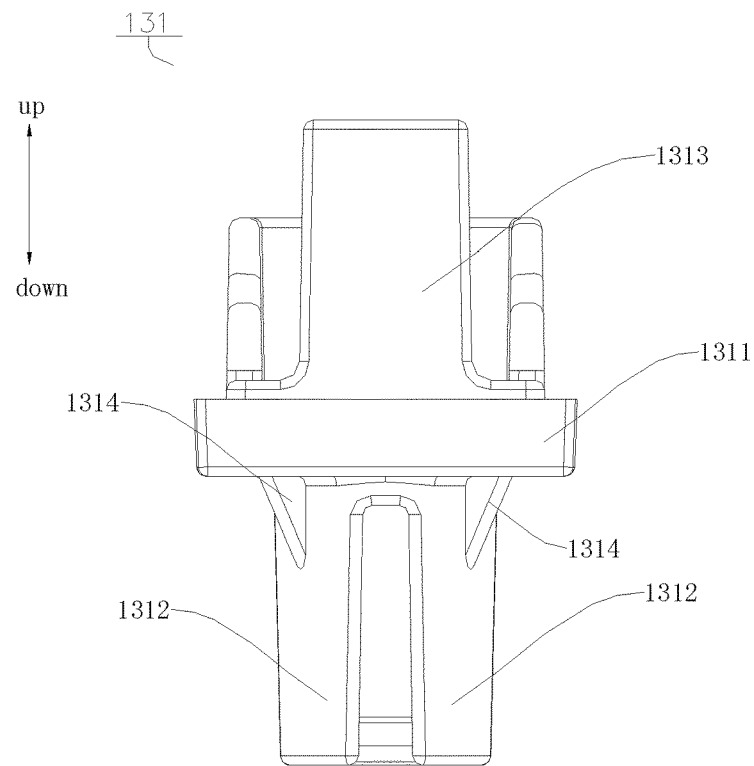
Figure 25:
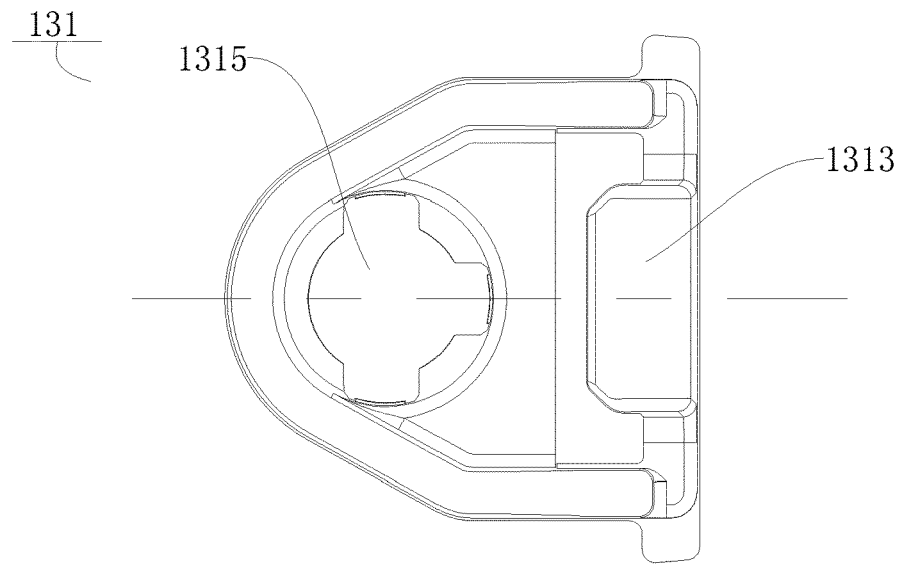
Figure 26:
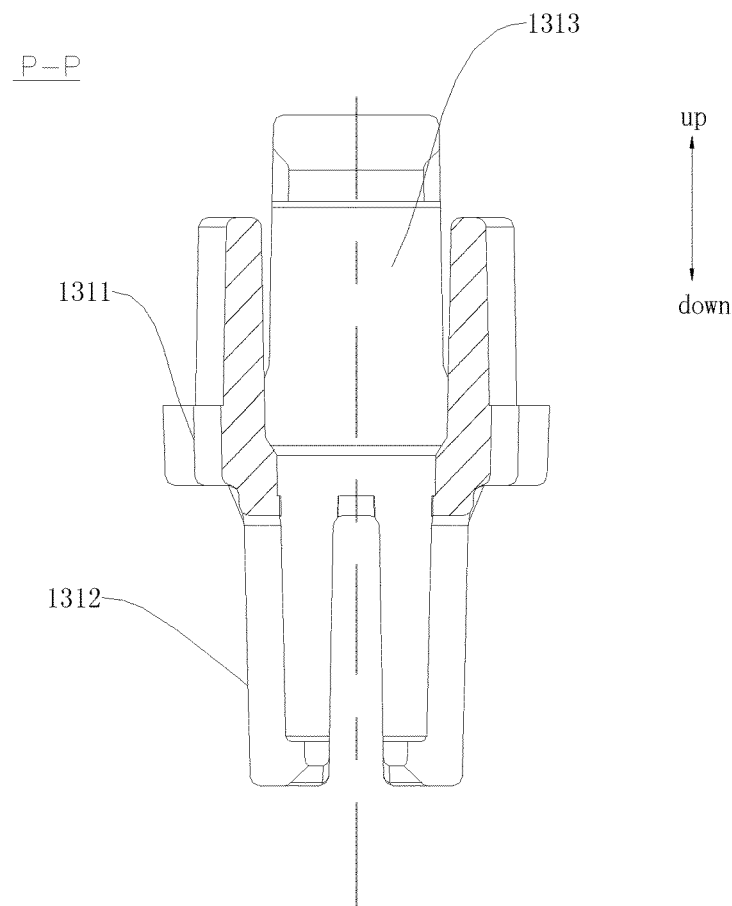
FIG. 26 and FIG. 27 are sectional views of FIG. 23 along P-P and T-T directions respectively.

In examples shown in FIG. 11 and FIG. 17-FIG. 27, the at least two first snap-joint feet 1312 extend downward from a lower end of the first body 1311 and are fitted over the location column 1211 so as to connect the first body 1311 with the second outer ring 121. As shown in FIG. 26, each first snap-joint feet 1312 abuts against the lower end face of the location column 1211 so as to limit the location column 1211 between the at least two first snap joint feet 1312. For the convenience of the connection between the first insulation snap 131 and the first outer ring 111, the first hook 1313 extends upward form an upper end of the first body 1311 and is snap-fitted with an edge of the first outer ring 111 so as to connect the first body 1311 and the first outer ring 111.

Figure 23:
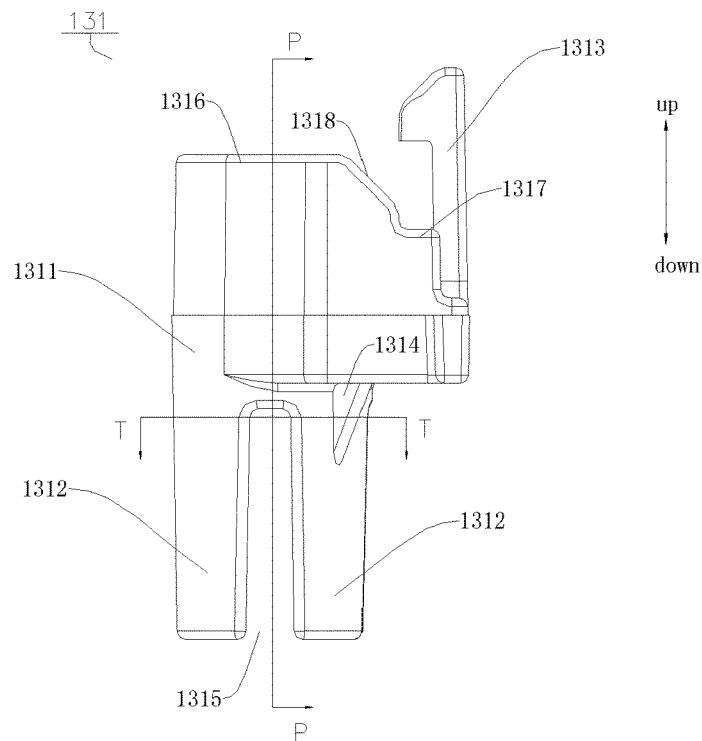
FIGS. 23-25 are a front view, a left view and a top view of the first insulation snap in FIG. 22 respectively.
Figure 27:
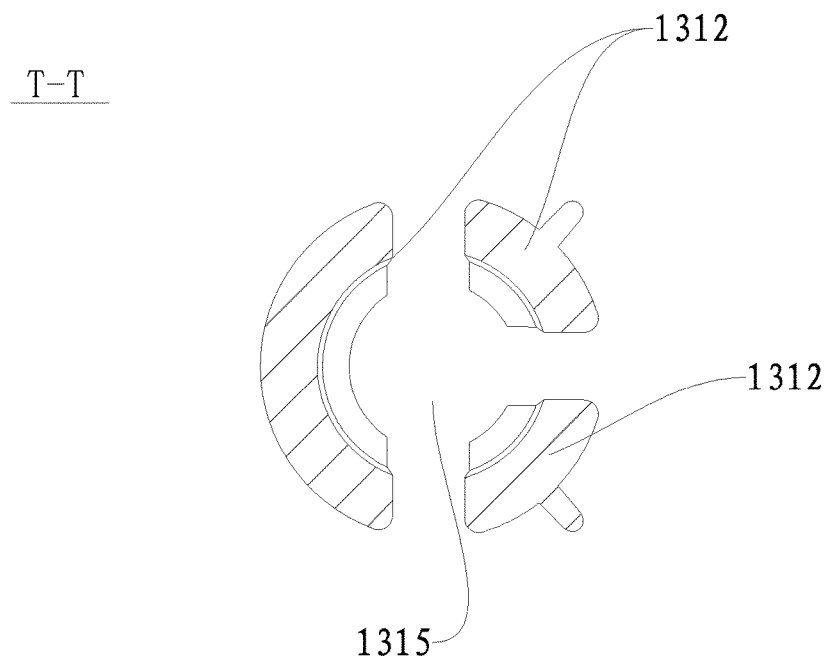

As shown in FIG. 23, FIG. 25 and FIG. 27, the first body 1311 is provided with a through hole 1315 penetrating through the first body 1311 along an up-down direction. In other words, the first body 1311 may have a tubular shape. Thus, on the premise that the structural strength of the first insulation snap 131 is ensured, the structure of the first insulation snap 131 is further simplified, the weight of the first insulation snap 131 is also reduced, and the production cost is decreased.

As shown in FIG. 23, in an embodiment of the present disclosure, an upper end face of the first body 1311 includes: a first segment 1316, a second segment 1317 and a connecting segment 1318. The first segment 1316 is located at a side away from the first hook 1313 and the first segment 1316 is in a horizontal plane. The second segment 1317 is disposed at a side adjacent to the first hook 1313 and the second segment 1317 is located in another horizontal plane lower than the horizontal plane where the first segment 1316 is. The connecting segment 1318 is connected between the first segment 1316 and the second segment 1317. In other words, a distance between the connecting segment 1318 and the first hook 1313 increases gradually from down to up. Thus, when the first hook 1313 is connected with other components, the connecting segment 1318 may play a role in guiding to facilitate connection between the first insulation snap 131 and other components, and as a result the assembly efficiency of the first insulation snap 131 is improved.

As shown in FIG. 23 and FIG. 24, the first insulation snap 131 may be made of material having an insulation characteristic, as which two components connected by the first insulation snap 131 are non-conducting between each other, thus the use demand for different components is satisfied. In order to improve the structure strength of the first insulation snap 131, a stiffening rib 1314 is connected between the first body 1311 and the first snap joint foot 1312. In an example shown in FIG. 24, a plurality of stiffening ribs 1314 may be provided and the stiffening ribs 1314 are distributed on the outer circumferential wall of the first body 1311 at intervals. In an example of the present disclosure, the stiffening rib 1314 is configured to be a triangular stiffening rib, a first side edge of the triangular stiffening rib is connected with the first body 1311, a second side edge of the triangular stiffening rib is connected with the first snap-joint foot 1312.

Figure 21:
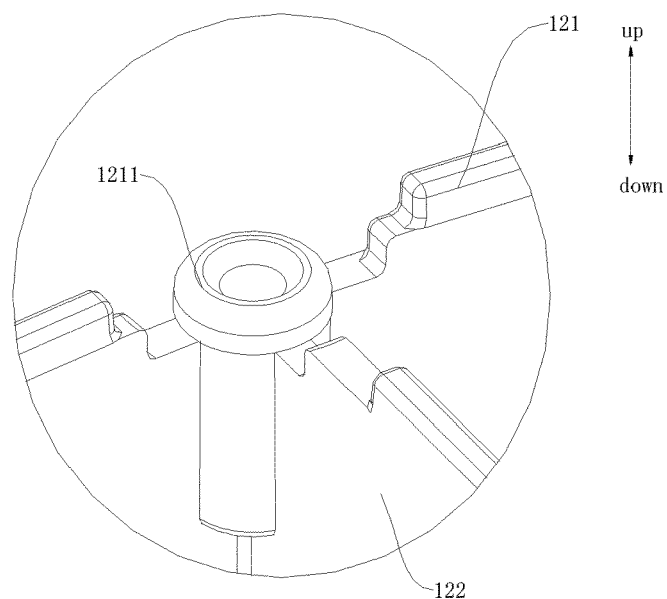
FIG. 21 is a partial enlarged view of area F in FIG. 4.

In order to improve the strength of connection between the first insulation snap 131 and the second annular ring 120, in an example shown in FIG. 21, the location column 1211 is disposed at an intersection of the second outer ring 121 and one of the second blades 122.

Figure 22:
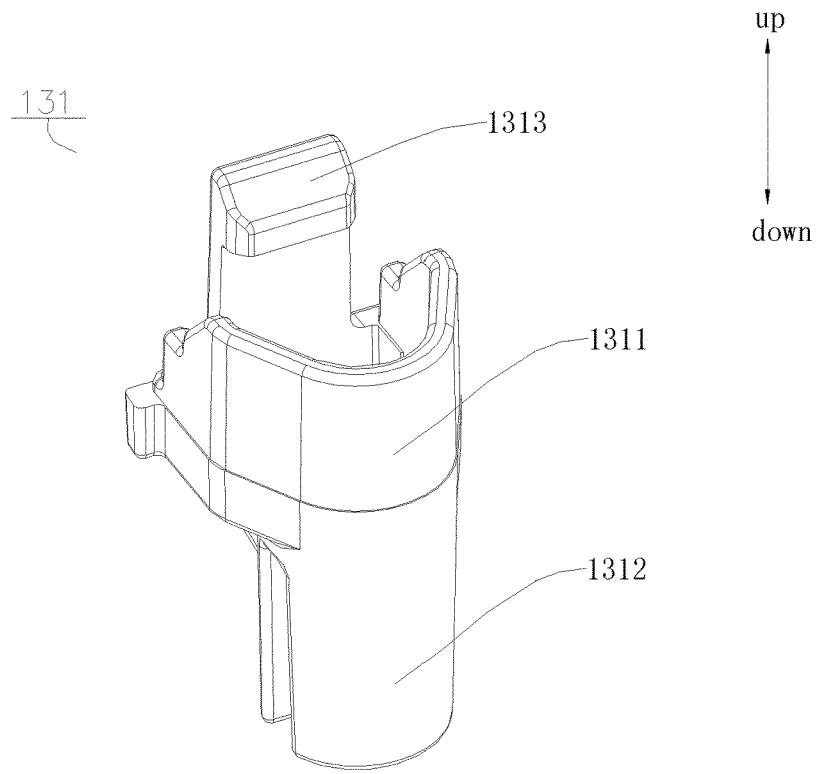
FIG. 22 is a perspective view of the first insulation snap in FIG. 4.

Furthermore, as shown in FIG. 22, an outside surface of the first body 1311 away from a center of the first outer ring 111 is configured to be an arcuate face, three first snap joint feet 1312 are provided, and one of the three first snap joint feet 1312 is snapped-fitted with an outside of the second outer ring 121 and an outer surface of the one first snap joint foot is flush with the arcuate face. Thus, a structural strength of the first insulation snap 131 can be enhanced further, which makes the structure of the first insulation snap 131 more reasonable.

Figure 9:
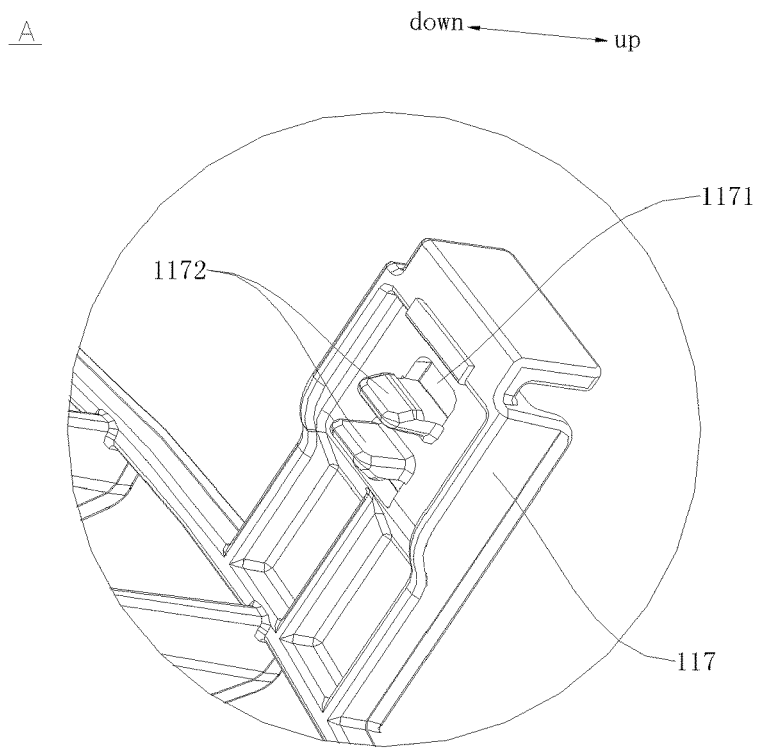
FIG. 9 and FIG. 10 are partial enlarged views of areas A and B in FIG. 5 respectively.
Figure 10:
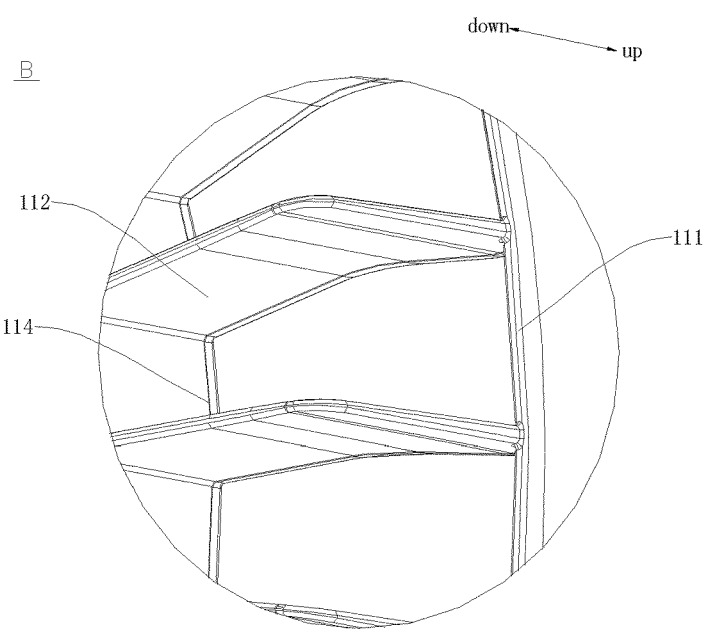

According to an embodiment of the present disclosure, as shown in FIG. 5, FIG. 6 and FIG. 9, the first annular ring 110 further includes a first connecting terminal 117, and the first connecting terminal 117 is disposed to a radially outer side of the first outer ring 111. As shown in FIG. 11-FIG. 12, the second annular ring 120 further includes second connecting terminal 127, the second connecting terminal 127 is disposed to a radially outer side of the second outer ring 121 and corresponding with the first connecting terminal 117 in the up-down direction. For the convenience of connection between the first annular ring 110 and the high voltage power source 500 and connection between the second annular ring 120 and the high voltage power source 500, the first electrically connecting piece 113 is disposed on the first connecting terminal 117, and the second electrically connecting piece 123 is disposed on the second connecting terminal 127. Further, in order to prevent the first connecting terminal 117 from contacting the second connecting terminal 127, as shown in FIG. 28-FIG. 29, the insulation spacing assembly 130 further includes a second insulation snap 132 disposed between the first connecting terminal 117 and the second connecting terminal 127.

In examples shown in FIG. 5-FIG. 6, FIG. 11-FIG. 12 and FIG. 28-FIG. 29, for the convenience of connection between the second insulation snap 132 and the first connecting terminal 117 and connection between the second insulation snap 132 and the second connecting terminal 127, the first connecting terminal 117 is provided with a first snap joint hole 1171, an resilient snap 1172 extends downward from a lower surface of the first connecting terminal 11, and the second connecting terminal 127 is provided with a second snap joint hole 1271. The second insulation snap 132 includes a second body 1321, a second hook 1323 and a projection 1324. The second body 1321 has a height larger than or equal to 2 mm, so that the distance between the first connecting terminal 117 and the second connecting terminal 127 is larger than or equal to 2 mm so that air is prevented from being broken down and discharges are prevented between the first connecting terminal 117 and the second connecting terminal 127.

Figure 28:
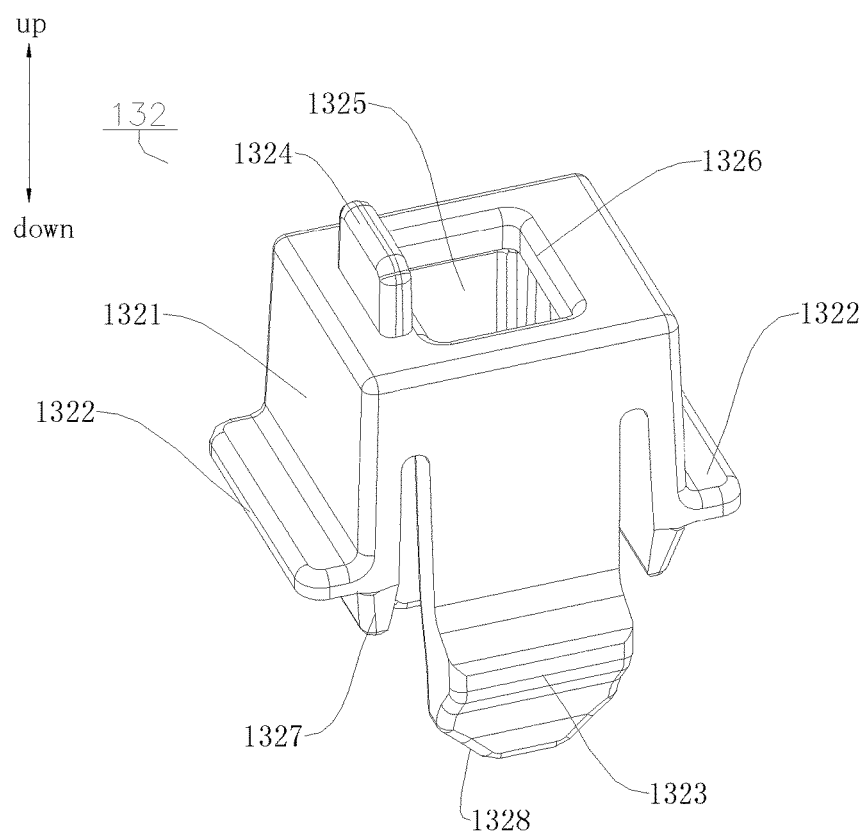
FIG. 28 is a perspective view of the second insulation snap in FIG. 4.

As shown in FIG. 28, the second body 1321 is hollow inside, has an opening in a top thereof as well as an opened bottom. The resilient snap 1172 goes through the opening, stretches into and is snap-fitted within the second body 1312. The projection 1324 extends upwards from the top of the second body 1321 and goes through the first snap joint hole 1171. Thus, it is guaranteed that the second insulation snap 132 and the first connecting terminal 117 are in reliable connection. As shown in FIG. 28, in an example of the present disclosure, a cross-section of the projection 1324 in the up-down direction is rectangular, and the cross-section area of the projection 1324 in the up-down direction increases from up to down. Thus, it is convenient for the projection 1324 to be fitted with other components.

Figure 29:
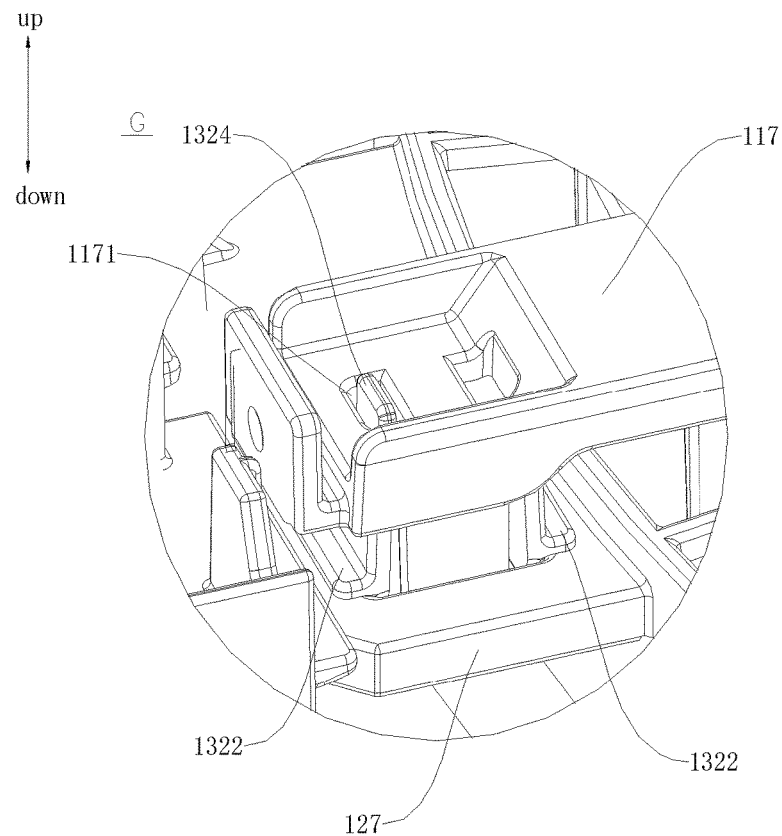
FIG. 29 is a partial enlarged view of area G in FIG. 3.
Figure 30:
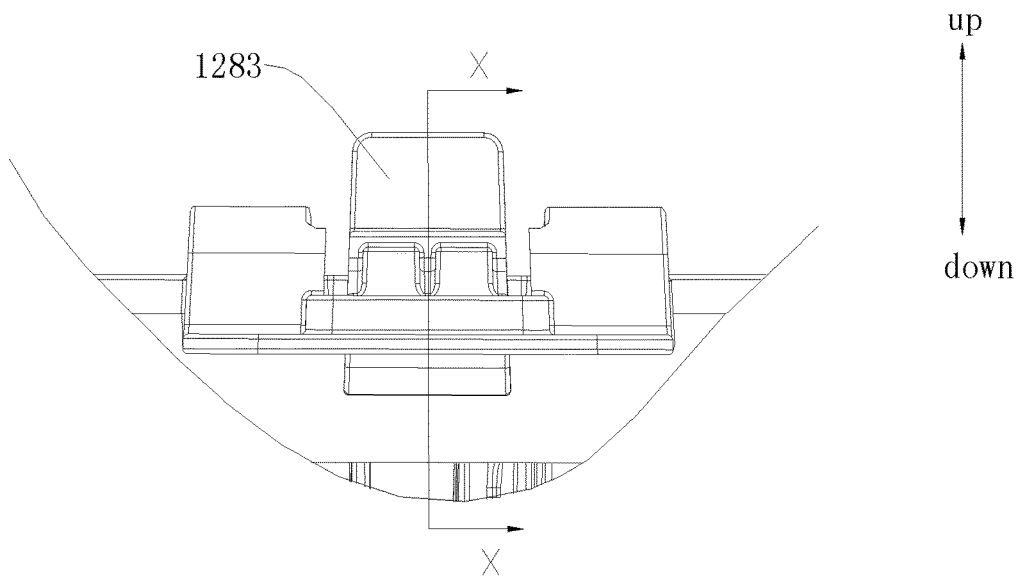
FIG. 30 is a partial enlarged view of a fitting place between an outer ring connecting terminal and an air guide in FIG. 3.
Figure 31:
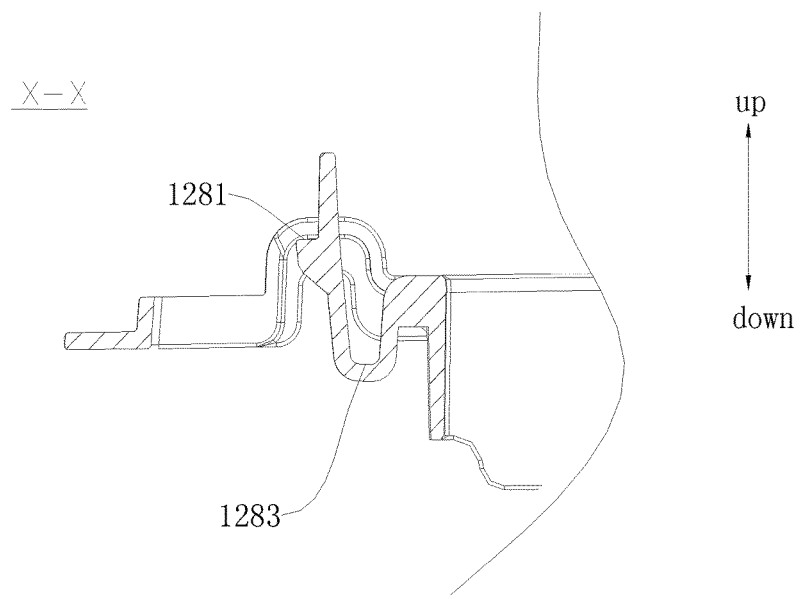
FIG. 31 is a sectional view of FIG. 30 along X-X direction.

As shown in FIG. 28 and FIG. 29, second snap joint feet 1322 extend outwards from two opposite sides of an outer surface of the second body 1321, and the second snap joint feet 1322 abut against an upper surface of the second connecting terminal 127. A second hook 1323a extends downward from a side wall of the second body 1321 between two second snap joint feet 1322 so as to go through the second snap joint hole 1271 and be snap-fitted to a bottom surface of the second connecting terminal 127, the second hook 1323 abuts against a lower surface of the second connecting terminal 127. As the second snap joint feet 1322 and the second hook 1323 are snapped into the second snap joint hole 1271, the movement of the second insulation snap 132 along the circumferential direction of the second snap joint hole 1271 is limited. With the second snap-joint feet 1322 abutting against the upper surface of the second connecting terminal 127 and the second hook 1323 abutting against the lower surface of the second connecting terminal 127, the movement of the second insulation snap 132 along the axial direction of the second snap-joint hole 1271 is limited. Thus, it is guaranteed that the second insulation snap 132 and the second connecting terminal 127 are in reliable connection.

As shown in FIG. 28, in an embodiment of the present disclosure, a cross-section of the second body 1321 in the up-down direction is square. Thus, a structural strength of the second insulation snap 132 can be enhanced further, which makes the structure of the second insulation snap 132 more compact and reasonable.

In an example shown in FIG. 28, a guiding arcuate face 1326 is formed between a side wall of an opening 1325 and an upper end face of the second body 1321. Thus, the guiding arcuate face 1326 plays a role in guiding to facilitate fitting and connection between other components and the second insulation snap 132. The shape of the opening 1325 is not particularly limited, for example, in an example of the present disclosure, as shown in FIG. 28, the opening 1325 is configured to be a square hole.

Further, as shown in FIG. 28, each second snap joint foot 1322 is disposed at a place adjacent to a lower end of the side wall of the second body 1321, and the side wall of the second body 1321 below each second snap joint foot 1322 is configured to be a guiding portion 1327. The cross-section area of the guiding portion 1327 decreases gradually in the up-down direction from up to down. Thus, the guiding portion 1327 can be used to guide the second snap joint feet 1322 to be fitted with the other components, so that the efficiency of assembling the second insulation snap 132 and the other components can be improved further.

Furthermore, as shown in FIG. 28, a guiding slope 1328 is formed between the lower end face of the second hook 1323 and the side wall of the second hook 1323. Thus, it is convenient for the second hook 1323 to be fitted with other components, and the efficiency of assembling the second insulation snap 132 is improved further.

In order to make it convenient for the first annular ring 110 to be assembled to the second annular ring 120, in examples shown in FIG. 1-FIG. 4, an external diameter of the first outer ring 111 is smaller than or equal to an external diameter of the second outer ring 121.

In addition, in an embodiment of the present disclosure, at least one of the first annular ring 110 and the second annular ring 120 is configured to be a high-internal-resistance annular ring, and a surface resistivity of the high-internal-resistance annular ring is $10^6 \sim 10^{12}$, that is the surface resistivity of the high-internal-resistance annular ring is $10^6$-$10^{12}$ Ω·m. For example, when the first annular ring 110 is a high-internal-resistance annular ring, the second annular ring 120 may be made of low-internal-resistance material such as aluminum or copper. In order to improve the safety performance of the dust collection assembly 100, the second annular ring 120 is connected with the low potential terminal. Person's health will not be influenced even touching the dust collection assembly 100 as the second annular ring made of the low-internal-resistance material is connected with the low potential terminal and current flows through the human body is limited in a safe range. When the first annular ring 110 and the second annular ring 120 are both made of conductive high-internal-resistance material, the high-internal-resistance material can limit the current in the first annular ring 110 and the second annular ring 120 within the safe range, and the human safety will not be in a risk when a person touches the dust collection assembly 100, thus the safety performance of the dust collection assembly 100 is improved. As a result, it is convenient for the high voltage direct current field at least above 2000V to be formed between the first blade 112 and the adjacent second blade 122, and further, the dust removal efficiency and dust effect of the dust collection assembly 100 can be guaranteed.

According to an embodiment of the present disclosure, the first annular ring 110 has the first outer ring 111 and the plurality of first blades 112 disposed in the inner surface of the first outer ring 111 along a circumferential direction of the first annular ring 110. The first blade 112 includes a first blade body 1121 and a raised portion 1122 of the first blade 112 protruding from one side edge of the first blade body 1121, a side face of the raised portion 1122 of the first blade is flush with a side face of the first blade body 1121. In other words, the first blade body 1121 and the raised portion 1122 of the first blade extend in the same plane. The raised portion 1122 of the first blade is connected with the first outer ring 111.

The second annular ring 120 has the second outer ring 121 and the plurality of second blades 122 disposed in an inner surface of the second outer ring 121 along a circumferential direction of the second annular ring 120. The second blade 122 includes a second blade body 1221 and a raised portion 1222 of the second blade protruding from one side edge of the second blade body 1221, a side face of the raised portion 1222 of the second blade is flush with a side face of the second blade body 1221. In other words, the second blade body 1221 and the raised portion 1222 of the second blade extend in the same plane. The raised portion 1222 of the second blade is connected with the second outer ring 121. As shown in FIG. 1-FIG. 4, the second annular ring 120 is disposed below the first annular ring 110 and the plurality of second blades 122 and the plurality of first blades 112 are arranged to be staggered in the circumferential direction. Thus, a plurality of high voltage direct current fields can be formed between the first annular ring 110 and the second annular ring 120, and as a result the dust removal efficiency of the dust collection assembly 100 is improved. By alternating the plurality of second blades 122 and the plurality of first blades 112 in the circumferential direction, the effective area of the high voltage direct current fields is enlarged, as which the dust removal efficiency of the dust collection assembly 100 is improved.

In an example of the present disclosure, as shown in FIG. 6, a thickness of the first blade body 1121 along the circumferential direction of the first annular ring 110 is larger than 0.5 mm, i.e. d1>0.5 mm. According to an embodiment of the present disclosure, d1=1.5 mm. As shown in FIG. 8, a width of the first blade body 1121 along the axial direction of the first annular ring 110 is larger than 5 mm. According to an embodiment of the present disclosure, the width of the first blade body 1121 along the axial direction of the first annular ring 110 is 36 mm. As shown in FIG. 12, the thickness of the second blade body 1221 along the circumferential direction of the second annular ring 120 is larger than 0.5 mm, i.e. d2>0.5 mm. According to an embodiment of the present disclosure, d2=1.5 mm. As shown in FIG. 14, the width of the second blade body 1221 along the axial direction of the second annular ring 120 is larger than 5 mm. According to an embodiment of the present disclosure, the width of the second blade body 1221 along the axial direction of the second annular ring 120 is 36 mm. Thus, the structure of the dust collection assembly 100 is simplified, which makes the structure of the dust collection assembly 100 more compact and reasonable. Meanwhile, hurts can be prevented if someone stretches his finger in to a gap between the first blade 112 and the second blade 122 by mistake.

Considering that the first annular ring 110 is located above the second annular ring 120, in order to guarantee that the first outer ring 111 is spaced apart from the second annular ring 120, in an example shown in FIG. 5, the first outer ring 111 is connected to the upper end (an up-down direction shown in FIG. 5) of the first blade 112, thus, the structure of the dust collection assembly 100 is more compact and reasonable.

Figure 38:
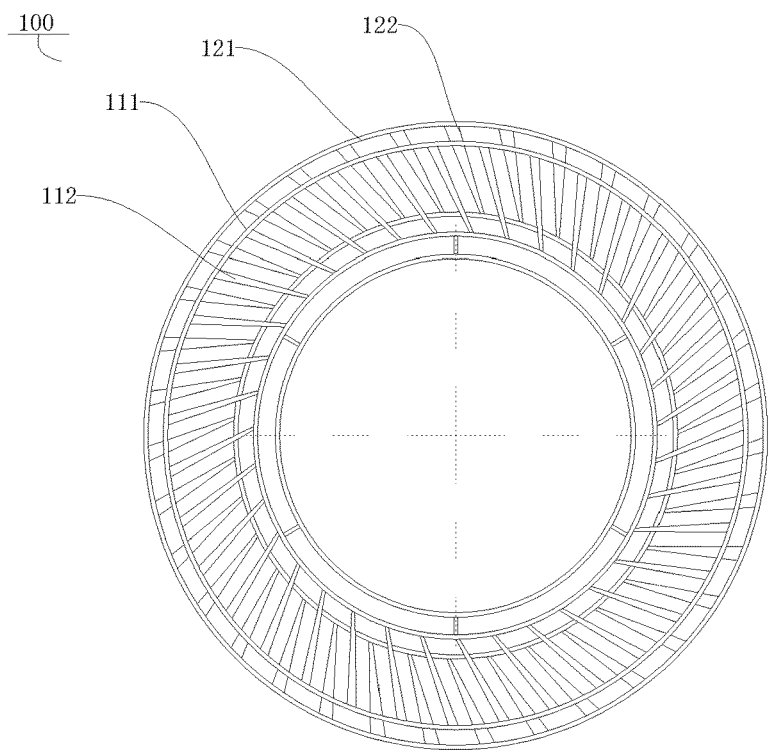
FIG. 38 is a schematic view of the dust collection assembly according to embodiments of the present disclosure.
Figure 39:
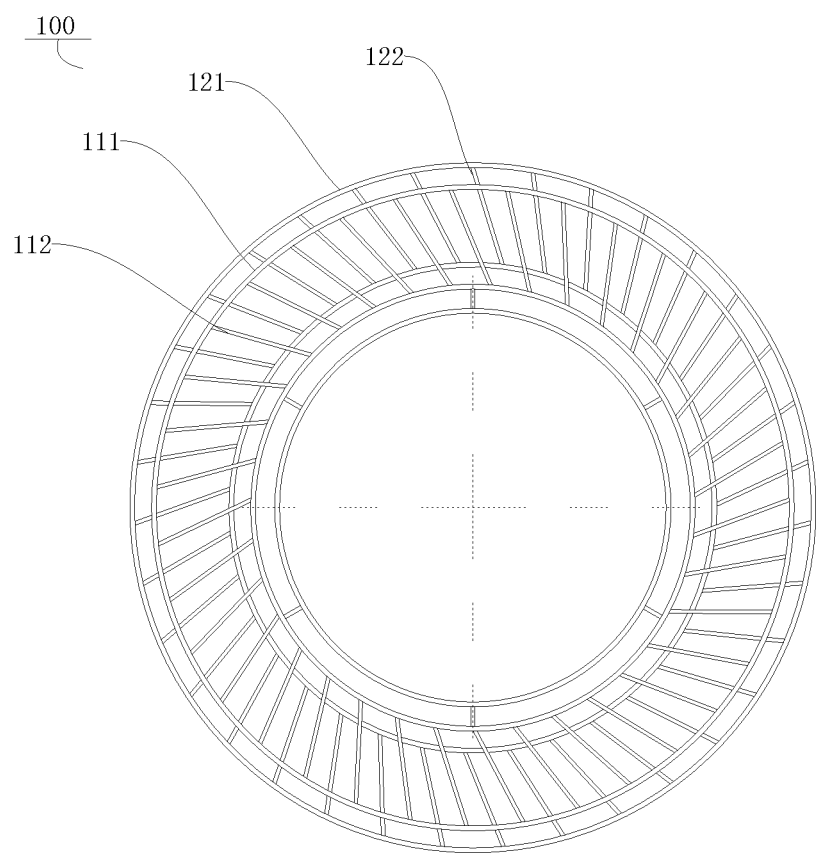
FIG. 39 is a schematic view of the dust collection assembly according to embodiments of the present disclosure.

In an example shown in FIG. 38, the thickness of the first blade 112 increases gradually from the radially inner side to the radially outer side and the thickness of the second blade 121 increases gradually from the radially inner side to the radially outer side, in the circumferential direction of the first annular ring 110. Thus, the corresponding area of the first blade 112 and the second blade 122 can be increased further, an effective high voltage direct current field forms between the first blade 112 and the adjacent second blade 122, so that the dust removal effect of the dust collection assembly 100 is improved and the dust removal efficiency of the dust collection assembly 100 is increased.

According to an embodiment of the present disclosure, as shown in FIG. 8 and FIG. 14, the raised portion 1122 of the first blade is disposed at a place adjacent to an intersection point of two adjacent side edges of the first blade body 1121; the raised portion 1222 of the second blade is disposed at a place adjacent to an intersection point of two adjacent side edges of the second blade body 1221. Thus, the corresponding area of the first blade 112 and the second blade 122 can be increased further, an effective high voltage direct current field forms between the first blade 112 and the adjacent second blade 122, so that the dust removal effect of the dust collection assembly 100 is improved and the dust removal efficiency of the dust collection assembly 100 is increased.

In an example shown in FIG. 4, both the first blade 112 and the second blade 122 may be configured to be a flat plate, and both the first blade 112 and the second blade 122 may be polygonal, oval or circular. According to an embodiment of the present disclosure, both the first blade 112 and the second blade 122 are rectangular. Thus, the structure of the dust collection assembly 100 is more compact and reasonable. Further, two adjacent side edges of the first blade in the rectangular plate shape are transited smoothly so as to avoid a point discharge, thus the safety performance of the dust collection assembly 100 is improved.

Figure 36:
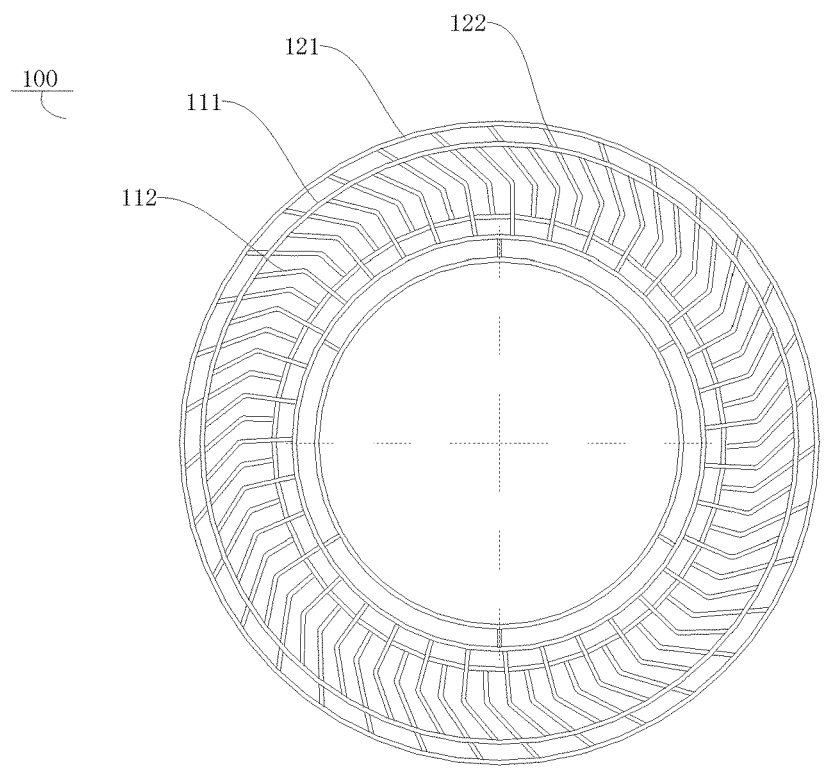
FIG. 36 is a schematic view of the dust collection assembly according to embodiments of the present disclosure.

It should be understood that, the shapes of the first blade 112 and the second blade 122 are not limited to this, for example, in an example shown in FIG. 36, both the first blade 112 and the second blade 122 are configured to be a bent plate and the shape of the cross-section of the first blade 112 corresponds to the shape of the cross-section of the second blade 122 in a direction perpendicular to the axial direction of the first annular ring 110. Thus, the corresponding area of the first blade 112 and the second blade 122 can be increased further, and areas on the first blade 112 and the second blade 122 where the field can be formed are improved, so that the dust removal efficiency of the dust collection assembly 100 is increased.

Figure 35:
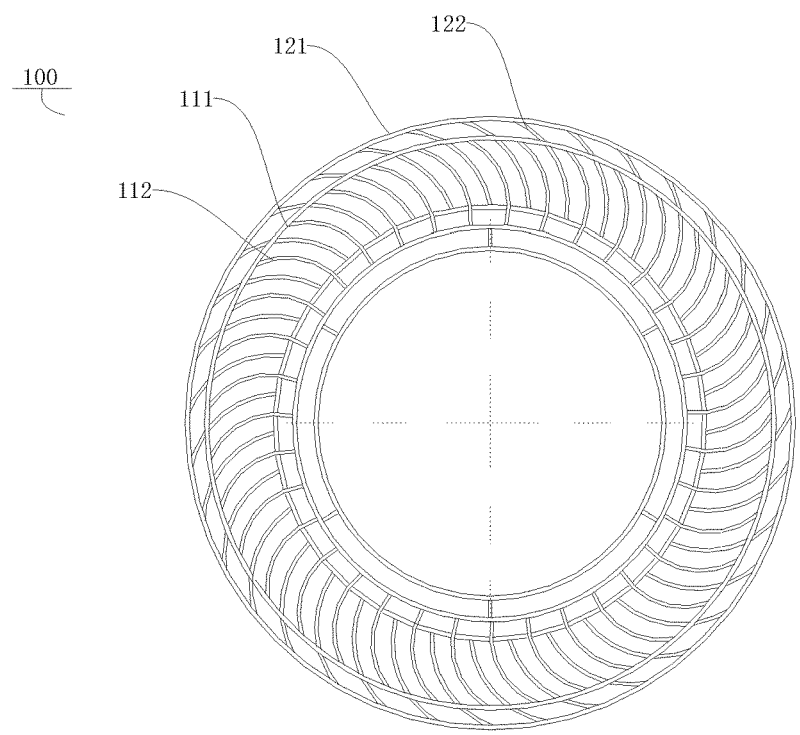
FIG. 35 is a schematic view of the dust collection assembly according to embodiments of the present disclosure.
Figure 37:
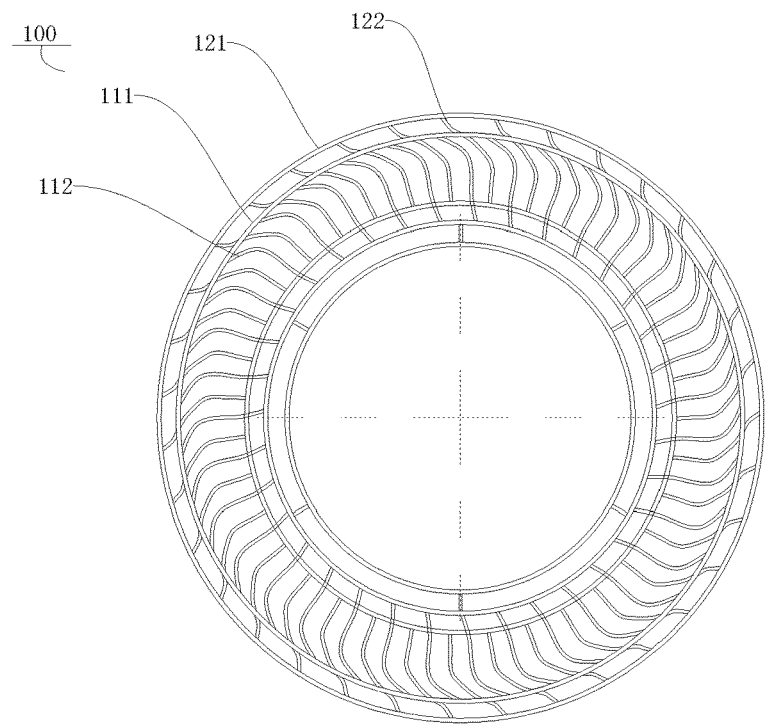
FIG. 37 is a schematic view of the dust collection assembly according to embodiments of the present disclosure.

As another example, in an example shown in FIG. 37, both the cross-sections of the first blade 112 and the second blade 122 have curve shapes in the direction perpendicular to the axial direction of the first annular ring 110, and the first blade 112 and the corresponding second blade 122 have the same radius of curvature. The first blade 112 and the second blade 122 having curve-shaped cross-sections further play a role in flow guiding. Further, in an example as shown in FIG. 35, the cross-sections of the first blade 112 and the second blade 122 are both arc.

As shown in FIG. 4, the first blade 112 extends along the radial direction of the first annular ring 110 and the second blade 122 extends along the radial direction of the second annular ring 120. Thus, the structure of the dust collection assembly 100 is more compact and reasonable. The extending directions of the first blade 112 and the second blade 122 are not limited to this, for example, in examples shown in FIG. 38-FIG. 39, the first blade 112 extends along a direction tilting relative to the radial direction of the first annular ring 110 and the second blade 122 extends along a direction tilting relative to the radial direction of the second annular ring 120.

According to an embodiment of the present disclosure, any two adjacent faces of the first annular ring 110 are transited smoothly and any two adjacent faces of the second annular ring 120 are transited smoothly. Thus, the point discharge can be prevented effectively so that the safety performance of the dust collection assembly 100 is improved.

The air purification device according to embodiments of the present disclosure includes the dust collection assembly 100 mentioned above.

With air purification device according to embodiments of the present disclosure provided with the dust collection assembly, the air guide is disposed out of the first annular ring and/or the second annular ring, the airflow can be guided to the place where the first annular ring 110 and the second annular ring 120 are located, as which the dust removal efficiency of the dust collection assembly 100 is improved. Meanwhile, the air guide 220 is made to be snapped to the first annular ring 110 and/or the second annular ring 120, the assembly process is simplified and the assembly efficiency is improved.

Meanwhile, by making the plurality of second blades 122 staggered from the plurality of first blades 112 in the circumferential direction, not only a plurality of high voltage direct current fields are formed between the first annular ring 110 and the second annular ring 120, the effective area of the high voltage direct current fields is also enlarged, as which the dust removal efficiency of the dust collection assembly 100 is improved. In addition, the plurality of first blades 112 and the plurality of second blades 122 have a function to rectify the airflow passing through the dust collection assembly 100, which enhances the uniformity of the airflow, further reduces the inlet pressure and flow resistance of the airflow, so the noise produced by flowing air is decreased.

According to some embodiments of the present disclosure, as shown in FIG. 4, the air guide 220 includes the first wind guiding ring 221 and the second wind guiding ring 222. Specifically, the first wind guiding ring 221 extends upward, archwise and gradually from inside to out along a radial direction. For example, in an example as shown in FIG. 4, the internal diameter of the first wind guiding ring 221 increases gradually from down to up (an up-down direction shown in FIG. 4). The second wind guiding ring 222 is connected to the upper end of the first wind guiding ring 221, and the upper surface of the second wind guiding ring 222 is in the same plane. At least a portion of the dust collection assembly 100 is located within the first wind guiding ring 221, and the dust collection assembly 100 is connected with the second wind guiding ring 222. Thus, more airflow can be guided into the dust collection assembly 100, so that the operation efficiency of the air purification device is improved. In an example of the present disclosure, as shown in FIG. 3-FIG. 4, the air guide 220 is connected with the second outer ring 121 of the dust collection assembly 100.

In examples shown in FIG. 30-FIG. 34, the air guide 220 is provided with a third hook 223 (namely, the air guide hook), the outer ring connecting terminal 128 extends out of the second outer ring 121, and the outer ring connecting terminal 128 is provided with the step face 1281 fitted with the third hook 223. With the third hook 223 abutting against the step face 1281, the movement of the outer ring connecting terminal 128 in the up-down direction (an up-down direction shown in FIG. 34) is limited.

As shown in FIG. 11, the outer ring connecting terminal 128 has the opening portion 1282 penetrating through the outer ring connecting terminal 128 along the up-down direction (the up-down direction shown in FIG. 11), the inner wall of the opening portion 1282 is provided with a bent plate 1283 extending downward firstly and then being bent upward, and the step face 1281 is disposed to an outside surface of the bent plate 1283. It should be understood that, in the radial direction of the second outer ring 121, the bent plate 1283 is resilient, and the third hook 223 includes a plate body 2231 extending upwards along the axial direction of the air guide 220 and the hook protrusion 2232 above the plate body 2231 and protruding towards the bent plate 1283. During the assembly, the outer ring connecting terminal 128 is mounted from up to down firstly, a lower portion of the step face 1281 abuts against the hook protrusion 2232 of the third hook 223, and the bent plate 1283 deforms inwards along the radial direction of the second outer ring 121. When the step face 1281 abuts against the lower end face of the hook protrusion 2232, the bent plate 1283 recovers outwards along the radial direction of the second outer ring 121. At this time, the hook protrusion 2232 is snap-fitted with the bent plate 1283. Thus, the process of assembling the air guide 220 and the dust collection assembly 100 is simplified and the reliability of connection between the air guide 220 and the dust collection assembly 100 is improved.

Further, as shown in FIG. 4, the air guide 220 is further provided with the first extending plate 224 extending upward and the first extending plate 224 is fitted within the opening portion 1282 and spaced apart from the bent plate 1283 so as to limit the movement of the outer ring connecting terminal 128 in the circumferential direction of the air guide 220. Furthermore, as shown in FIG. 4 and FIG. 32, the air guide 220 is further provided with the second extending plate 225 extending upward, and the second extending plate 225 and the first extending plate 224 define an accommodating groove 226 accommodating an outer end of the outer ring connecting terminal 128 together. Thus, the reliability of connection between the outer ring connecting terminal 128 and the air guide 220 can be improved further.

The air conditioner (not shown in the drawings) according to embodiments of the present disclosure includes a casing and the dust collection assembly 100 mentioned above. Specifically, the casing is provided with an air channel so as to define a path of air flowing through the air conditioner. It should be understood that, a position of the air channel is not defined specifically, for example, the air channel may be located within the casing. The air channel has an air inlet and an air outlet, and the air enters the air channel from the air inlet and is discharged out of the air channel from the air outlet. The dust collection assembly 100 is disposed in the air channel so as to purify and de-dust the air entering the air channel. Considering that the dust collection assembly 100 needs cleaning periodically, in order to make it convenient for the user to clean the dust collection assembly 100, the dust collection assembly 100 is disposed at a place adjacent to the air inlet or the air outlet. According to an embodiment of the present disclosure, the dust collection assembly 100 is located in a position adjacent to the air inlet. Thus, the airflow entering the air channel can be purified and dedusted at first so as to prevent the dust and other particulate matter from being stacked inside of the air channel, which are inconvenient for the user to clean.

With the air conditioner according to embodiments of the present disclosure provided with the above dust collection assembly 100, by disposing the air guide out of the first annular ring and/or the second annular ring, the airflow can be guided to the place where the first annular ring 110 and the second annular ring 120 are located, as which the dust removal efficiency of the dust collection assembly 100 is improved. Meanwhile, through the air guide 220 being snap-fitted with the first annular ring 110 and/or the second annular ring 120, the assembly process is simplified and the assembly efficiency is improved.

Meanwhile, by making the plurality of second blades 122 interleaved with the plurality of first blades 112 in the circumferential direction, not only a plurality of high voltage direct current fields are formed between the first annular ring 110 and the second annular ring 120, the effective area of the high voltage direct current fields is also enlarged, as which the dust removal efficiency of the dust collection assembly 100 is improved. In addition, the plurality of first blades 112 and the plurality of second blades 122 have a function to rectify the airflow passing through the dust collection assembly 100, which enhances the uniformity of the airflow, further reduces the inlet pressure and flow resistance of the airflow, so the noise produced by flowing air is decreased.

In order to improve the purification efficiency of the air conditioner, the air conditioner may further include a negative ion emission and ionization device (not shown in the drawings). The negative ion emission and ionization device is located in the air channel in the flow direction of the air in the air channel so as to pre-charge negative electricity to the airflow and thus making a large amount of the dust and particulate matters in the airflow electronegative. The electronegative dust and particulate matters are captured by the high voltage direct current field rapidly when flowing through the air conditioner along with the airflow, thus the dust removal effect is promoted further.

Reference throughout this specification to "an embodiment," "some embodiments," "illustrative embodiment", "an example," "a specific example," or "some examples," means that a particular feature, structure, material, or characteristic described in connection with the embodiment or example is included in at least one embodiment or example of the present disclosure. In the present specification, the illustrative statement of the terms above is not necessarily referring to the same embodiment or example. Furthermore, the particular features, structures, materials, or characteristics may be combined in any suitable manner in one or more embodiments or examples. In addition, the different embodiments or examples as well as the features in the different embodiments or examples described in the specification can be combined or united by those skilled in the related art in the absence of contradictory circumstances.

Although embodiments of the present disclosure have been shown and described, it would be appreciated by those skilled in the art that changes, alternatives, variation and modifications can be made to the embodiments within the spirit and principle of the present disclosure, and the scope of the present disclosure is defined by the claims and its equivalents.

What is claimed is:

1. A dust collection assembly, comprising:
    a first annular ring having a first outer ring and a plurality of first blades disposed in an inner surface of the first outer ring along a circumferential direction, wherein the first annular ring has a first electrically connecting piece configured to be connected with one of a positive pole and a negative pole of a power source;
    a second annular ring having a second outer ring and a plurality of second blades disposed in an inner surface of the second outer ring along a circumferential direction, wherein the second annular ring is disposed below the first annular ring, the plurality of second blades and the plurality of first blades are arranged to be staggered in the circumferential direction, and the second annular ring has a second electrically connecting piece configured to be connected with the other one of the positive pole and the negative pole of the power source;
    an insulation spacing assembly disposed between the first annular ring and the second annular ring and spacing the first annular ring and the second annular ring apart; and
    an air guide configured to have an annular shape and fitted over the first annular ring and/or the second annular ring, wherein the air guide is connected with the first annular ring and/or the second annular ring by means of a snap, and an external diameter of an upper end of the air guide is larger than an external diameter of an lower end of the air guide.

2. The dust collection assembly according to claim 1, wherein the air guide is connected with the second outer ring by means of the snap.

3. The dust collection assembly according to claim 2, wherein the air guide has an air guide hook, an outer ring connecting terminal extends out of the second outer ring, and the outer ring connecting terminal has a step face fitted with the air guide hook.

4. The dust collection assembly according to claim 3, wherein the outer ring connecting terminal has an opening portion penetrating through the outer ring connecting terminal along an up-down direction, an inner wall of the opening portion is provided with a bent plate extending downward firstly and then being bent upward, and the step face is disposed to an outside surface of the bent plate.

5. The dust collection assembly according to claim 4, wherein the air guide further comprises a first extending plate extending upward, and the first extending plate is fitted within the opening portion and spaced apart from the bent plate.

6. The dust collection assembly according to claim 5, wherein the air guide further comprises a second extending plate extending upward, and the second extending plate and the first extending plate define an accommodating groove accommodating an outer end of the outer ring connecting terminal together.

7. The dust collection assembly according to claim 1, wherein the air guide comprises:
    a first wind guiding ring extending upward, archwise and gradually from inside to outside along a radial direction; and
    a second wind guiding ring connected at an upper end of the first wind guiding ring, wherein an upper surface of the second wind guiding ring is in one plane.

8. The dust collection assembly according to claim 1, wherein a shortest distance between the first annular ring and the second annular ring is larger than or equal to 2 mm.

9. The dust collection assembly according to claim 8, wherein a distance between a first blade and an adjacent second blade is 2-40 mm.

10. The dust collection assembly according to claim 8, wherein a thickness of the first blade along the circumferential direction of the first annular ring is larger than 0.5 mm and a width of the first blade along an axial direction of the first annular ring is larger than 5 mm; and
a thickness of the second blade along the circumferential direction of the second annular ring is larger than 0.5 mm, and a width of the second blade along an axial direction of the second annular ring is larger than 5 mm.

11. The dust collection assembly according to claim 10, wherein both of the thicknesses of the first blade and the second blade are 1.5 mm and both of the widths of the first blade and the second blade are 36 mm.

12. The dust collection assembly according to claim 1, wherein the first outer ring is connected to an upper end of the plurality of first blades at a radially outer side of the plurality of first blades, and an upper surface of the plurality of first blades at the radially outer side is higher than an upper surface of the plurality of first blades at a radially inner side.

13. The dust collection assembly according to claim 12, wherein the first annular ring further comprises:
a first inner ring connected to the radially inner side of the plurality of first blades.

14. The dust collection assembly according to claim 13, wherein the first annular ring further comprises:
a first reinforcing ring connected to an inner surface of the first inner ring by means of a plurality of first reinforcing ribs arranged along a circumferential direction.

15. The dust collection assembly according to claim 12, wherein a lower surface of the plurality of second blades at a radially outer side is higher than a lower surface of the plurality of second blades at a radially inner side.

16. The dust collection assembly according to claim 15, wherein the second annular ring further comprises:
a second inner ring connected to a lower end of the plurality of second blades at the radially inner side.

17. The dust collection assembly according to claim 16, wherein the second annular ring further comprises:
a second reinforcing ring connected to an inner surface of the second inner ring by means of a plurality of second reinforcing ribs arranged along a circumferential direction.

18. The dust collection assembly according to claim 1, wherein the insulation spacing assembly comprises at least one first insulation snap, and the first insulation snap is mounted to the first outer ring and the second outer ring so as to connect the first outer ring and the second outer ring in a spaced manner.

19. The dust collection assembly according to claim 18, wherein a circumferential wall of the second outer ring is provided with a location column, and the first insulation snap comprises:
a first body having a height larger than or equal to 2 mm;
at least two first snap-joint feet, and the at least two first snap-joint feet extend downward from a lower end of the first body and are fitted over the location column so as to connect the first body with the second outer ring; and
a first hook extending upward from an upper end of the first body and snap-fitted with an edge of the first outer ring so as to connect the first body with the first outer ring.

20. The dust collection assembly according to claim 18, wherein the first annular ring further comprises a first connecting terminal disposed to a radially outer side of the first outer ring, and the first electrically connecting piece is disposed on the first connecting terminal;
the second annular ring further comprises a second connecting terminal disposed to a radially outer side of the second outer ring and corresponding with the first connecting terminal in the up-down direction, and the second electrically connecting piece is disposed on the second connecting terminal; and
the insulation spacing assembly further comprises a second insulation snap disposed between the first connecting terminal and the second connecting terminal.

21. The dust collection assembly according to claim 20, wherein the first connecting terminal is provided with a first snap joint hole, and a resilient snap extends downward from a lower surface of the first connecting terminal; the second connecting terminal is provided with a second snap joint hole;
the second insulation snap comprises:
a second body, having a hollow interior, a height larger than or equal to 2 mm, and an opening in a top thereof as well as an opened bottom, wherein the resilient snap goes through the opening, stretches into and is snap-fitted within the second body, second snap joint feet extend outwards from two opposite sides of an outer surface of the second body, and the second snap-joint feet abut against an upper surface of the second connecting terminal;
a second hook extending downward from a side wall of the second body between two second snap-joint feet so as to go through the second snap-joint hole and be snap-fitted to a bottom surface of the second connecting terminal, the second hook abuts against a lower surface of the second connecting terminal; and
a projection extending upwards from the top the second body and goes through the first snap-joint hole.

22. The dust collection assembly according to claim 1, wherein the first blade comprises a first blade body and a raised portion of the first blade protruding from one side edge of the first blade body, a side face of the raised portion of the first blade is flush with a side face of the first blade body, and the raised portion of the first blade is connected with the first outer ring,
the second blade comprises a second blade body and a raised portion of the second blade protruding from one side edge of the second blade body, a side face of the raised portion of the second blade is flush with a side face of the second blade body, and the raised portion of the second blade is connected with the second outer ring.

23. An air purification device, comprising a dust collection assembly comprising:
a first annular ring having a first outer ring and a plurality of first blades disposed in an inner surface of the first outer ring along a circumferential direction, wherein the first annular ring has a first electrically connecting piece configured to be connected with one of a positive pole and a negative pole of a power source;
a second annular ring having a second outer ring and a plurality of second blades disposed in an inner surface of the second outer ring along a circumferential direction, wherein the second annular ring is disposed below the first annular ring, the plurality of second blades and the plurality of first blades are arranged to be staggered in the circumferential direction, and the second annular ring has a second electrically connecting piece configured to be connected with the other one of the positive pole and the negative pole of the power source;
an insulation spacing assembly disposed between the first annular ring and the second annular ring and spacing the first annular ring and the second annular ring apart; and an air guide configured to have an annular shape and fitted over the first annular ring and/or the second annular ring, wherein the air guide is connected with the first annular ring and/or the second annular ring by means of a snap, and an external diameter of an upper end of the air guide is larger than an external diameter of an lower end of the air guide.

24. An air conditioner, comprising:

a casing having an air channel, wherein the air channel has an air inlet and an air outlet; and a dust collection assembly comprising:

a first annular ring having a first outer ring and a plurality of first blades disposed in an inner surface of the first outer ring along a circumferential direction, wherein the first annular ring has a first electrically connecting piece configured to be connected with one of a positive pole and a negative pole of a power source;

a second annular ring having a second outer ring and a plurality of second blades disposed in an inner surface of the second outer ring along a circumferential direction, wherein the second annular ring is disposed below the first annular ring, the plurality of second blades and the plurality of first blades are arranged to be staggered in the circumferential direction, and the second annular ring has a second electrically connecting piece configured to be connected with the other one of the positive pole and the negative pole of the power source;

an insulation spacing assembly disposed between the first annular ring and the second annular ring and spacing the first annular ring and the second annular ring apart; and an air guide configured to have an annular shape and fitted over the first annular ring and/or the second annular ring, wherein the air guide is connected with the first annular ring and/or the second annular ring by means of a snap, and an external diameter of an upper end of the air guide is larger than an external diameter of an lower end of the air guide;

wherein the dust collection assembly is disposed in the air channel and located in a position adjacent to the air inlet or the air outlet.

* * * * *